United States Patent
Gupta et al.

(10) Patent No.: US 12,131,576 B2
(45) Date of Patent: *Oct. 29, 2024

(54) METHOD FOR VERIFYING THE IDENTITY OF A USER BY IDENTIFYING AN OBJECT WITHIN AN IMAGE THAT HAS A BIOMETRIC CHARACTERISTIC OF THE USER AND SEPARATING A PORTION OF THE IMAGE COMPRISING THE BIOMETRIC CHARACTERISTIC FROM OTHER PORTIONS OF THE IMAGE

(71) Applicant: Identy Inc., Dover, DE (US)

(72) Inventors: Hardik Gupta, Jabalpur (IN); Satheesh Murugan, Ramapuram (IN); Jesus Aragon, Majadahonda (ES)

(73) Assignee: Identy Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,926

(22) Filed: Aug. 16, 2023

(65) Prior Publication Data

US 2023/0394871 A1  Dec. 7, 2023

Related U.S. Application Data

(63) Continuation of application No. 17/433,318, filed as application No. PCT/IB2020/051523 on Feb. 24, 2020, now Pat. No. 11,783,625.

(30) Foreign Application Priority Data

Feb. 26, 2019  (EP) .................................. 19382137

(51) Int. Cl.
*G06K 9/46* (2006.01)
*G06K 9/62* (2022.01)
(Continued)

(52) U.S. Cl.
CPC ........... *G06V 40/1365* (2022.01); *G06N 3/08* (2013.01); *G06V 10/25* (2022.01); *G06V 40/1318* (2022.01)

(58) Field of Classification Search
CPC ....................... G06V 40/1347–40/1359; G06V 40/12–40/1394; G06V 10/25; G06T 7/10–7/194; G06N 3/04–3/0499
See application file for complete search history.

(56) References Cited

U.S. PATENT DOCUMENTS

| 9,968,257 B1 * | 5/2018 | Burt ..................... A61B 5/0035 |
| 2014/0068740 A1 | 3/2014 | Yann et al. |

(Continued)

FOREIGN PATENT DOCUMENTS

| CN | 108009520 A | 5/2018 |
| JP | 2015-529365 A | 10/2015 |
| JP | 2018-508888 | 3/2018 |

OTHER PUBLICATIONS

PCT International Search Report for PCT Application No. PCT/IB2020/051523, mailed Apr. 21, 2020, 3 pages.
(Continued)

*Primary Examiner* — Brian Werner
(74) *Attorney, Agent, or Firm* — Lowenstein Sandler LLP

(57) ABSTRACT

A method includes obtaining, by a processing device from an optical sensor of a mobile device, an image of an object; processing, by the processing device, the image using a neural network, wherein processing the image includes distinguishing, using the neural network, a first portion of the image including a region of interest, ROI, from a second portion of the image, wherein processing the image comprises processing the image by an encoder to obtain an encoded image and processing the encoded image by a decoder to obtain a decoded output image; after processing the image, extracting, by the processing device, a biometric
(Continued)

characteristic of the object from the ROI; extracting, by the processing device, a biometric characteristic of the object from the ROI; and processing, by the processing device, the biometric characteristic of the object to determine whether the biometric characteristic of the object identifies a user.

20 Claims, 7 Drawing Sheets

(51) Int. Cl.
    *G06N 3/08*     (2023.01)
    *G06V 10/25*     (2022.01)
    *G06V 40/12*     (2022.01)
    *G06V 40/13*     (2022.01)

(56) References Cited

U.S. PATENT DOCUMENTS

2016/0232401 A1* 8/2016 Hoyos ................ G06V 40/1376
2018/0137406 A1   5/2018 Howard et al.
2019/0057507 A1   2/2019 El-Khamy et al.
2020/0175334 A1* 6/2020 Zhang ................... G06F 18/217
2022/0284638 A1* 9/2022 Zhu ......................... G06T 7/194

OTHER PUBLICATIONS

The Extended European Search Report for EP Application No. EP19382137.8, mailed Aug. 19, 2019, 15 pages.
Notification of Reasons for Refusal for JP Application No. 2021-549736, mailed Oct. 14, 2022, 3 pages.
Stojanovic et al., "Fingerprint ROI Segmentation Based on Deep Learning", 24th Telecommunications forum TELFOR 2016, IEEE, Serbia, Belgrade, Nov. 22-23, 2016, 4 pages total. (Year: 2016).
Shibuya, Naoki: "Up-sampling with Transposed Convolution", Nov. 13, 2017 Retrieved from the Internet: https://medium.com/activating-robotic-minds/up-sampling-with-transposed-convolution-9ae4f2df52do, 11 Pages.
Wang, Chi-Feng: "A Basic Introduction to Separable Convolutions—Towards Data Science", Aug. 14, 2018, Retrieved from the Internet: https://towardsdatascience.com/a-basic-introcution-to-separable-convolutions-D99ec3102728, 9 pages.
Notification of Reasons for Refusal for JP Application No. 2021-549736, mailed Feb. 26, 2 pages.

* cited by examiner

METHOD FOR VERIFYING THE IDENTITY OF A USER BY IDENTIFYING AN OBJECT WITHIN AN IMAGE THAT HAS A BIOMETRIC CHARACTERISTIC OF THE USER AND SEPARATING A PORTION OF THE IMAGE COMPRISING THE BIOMETRIC CHARACTERISTIC FROM OTHER PORTIONS OF THE IMAGE

RELATED APPLICATIONS

This patent application is a continuation of U.S. patent application Ser. No. 17/433,318, filed on Aug. 24, 2021, which claims the benefit of International Application No. PCT/IB2020/051523, filed Feb. 24, 2020, which claims priority to European Application No. EP19382137.8, filed Feb. 26, 2019. The entire contents of each application are hereby incorporated by reference.

TECHNICAL FIELD

Aspects of the present invention refer to a method for identifying a user using an image of an object of the user that has a biometric characteristic of the user, like a fingerprint or a set of fingerprints of fingertips, and a mobile device for implementing the respective method.

BACKGROUND

At present, it is known to use, for example, fingerprints or other biometric characteristics like specific geometric distances between points in the face or the palm creases of the hand in order to identify a user. This makes it necessary to obtain visual information (i.e. an image) of the respective object that carries the biometric characteristic of the user and further processing this biometric characteristic. This further processing can comprise comparing the obtained biometric characteristic to a stored or otherwise known biometric characteristic of a specific user. If the obtained biometric characteristic matches that already known or stored biometric characteristic, the user is identified by the obtained biometric characteristic.

In view of the most recent developments of mobile devices, it is now possible to obtain the image of the object carrying the biometric characteristic remote from the actual software or other hardware that preforms the identification of the user by, for example, using an optical sensor like a camera of a mobile device in order to obtain the respective image of the object. In order to later identify the user, it is then necessary to forward the object to the entity that performs the identification.

As the entity preforming the identification is usually only capable or most suitably adapted to process the biometric characteristic as such, it can cause problems when forwarding a full image where only a part of the image comprises the object carrying the biometric characteristic to the respective entity. Additionally, this would lead to significant data transfer as the whole image would have to be forwarded to the respective entity.

On the other hand, it is necessary to make sure that the relevant object carrying the biometric characteristic is properly provided to the entity preforming the identification.

In view of the above, it would be advantageous to allow for the identification of a user using a biometric characteristic of the user obtained by taking an image of the object while, at the same time, reducing the amount of unnecessary or non-processable image information provided to the entity preforming the identification of the user.

DETAILED DESCRIPTION

Figure 1:
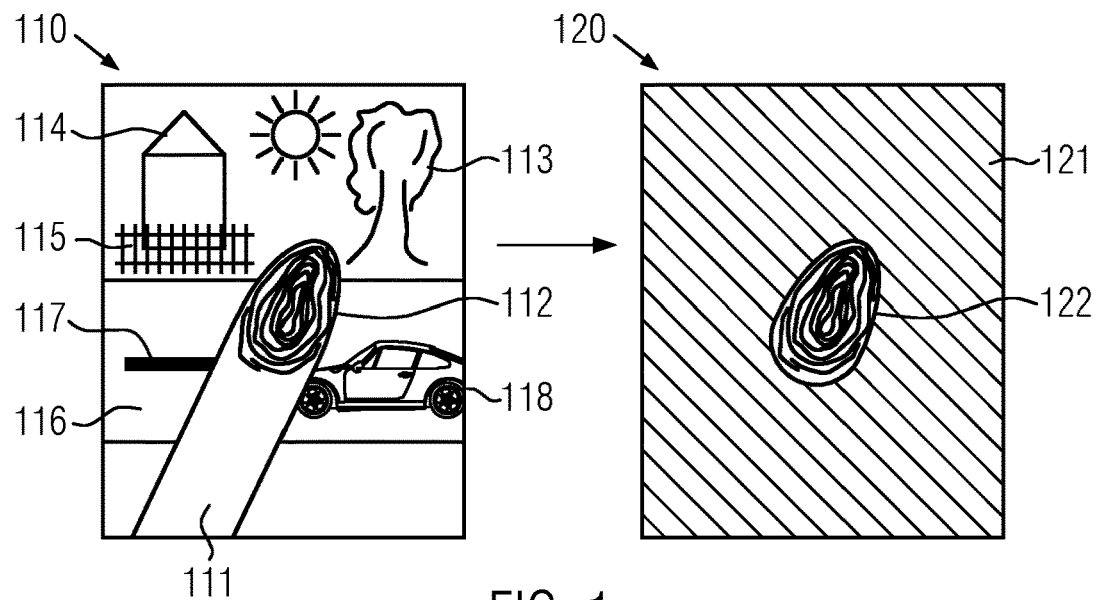
FIG. 1 is a schematic depiction of a real image compared to an actual region of interest in an image, according to some embodiments.

In at least some embodiments, one or more objective of the present invention is solved according to the methods and/or mobile device described herein.

In at least one embodiment, a method for identifying a user using an image of an object of the user that has a biometric characteristic of the user, like a fingerprint or a set of fingerprints of fingertips, comprises:
  obtaining, by an optical sensor of a mobile device, the image of the object;
  providing the image or a part of the image to a neural network;
  processing the image or the part of the image by the neural network, comprising distinguishing, by the neural network, a portion of the image or the part of the image comprising the region of interest, ROI, from another portion of the image;
  extracting, from the image or the part of the image, the portion of the image comprising the ROI; and storing the portion of the image comprising the ROI in a storage device and/or
  providing the portion of the image comprising the ROI as input to an identification means. The identification means may extract the biometric characteristic of the ROI from the portion of the image and process the extracted biometric characteristic in order to determine whether the extracted biometric characteristic identifies the user.

The object of the user that has a biometric characteristic of the user can be any object that is suitable, due to the biometric characteristic it carries, to identify the user, i.e. to distinguish the user from any other potential user. This holds, for example, for fingerprints or the iris of the eye or the palm creases of the hand and also for geometric features in the face. Likewise, for example, a footprint can be used to identify and distinguish a user form another person. The objects may thus be, for example, a fingertip or a finger, the face, an eye, the palm of a hand or a foot. Other objects may be deemed suitable as well. While, in the following, reference will usually be made to the object in general or a fingertip as example for further explanations, it is clear that every embodiment can also be realized using one or more of the objects mentioned above, either alone or in combination with each other.

The region of interest is that region of the image of an object that actually carries the biometric characteristic. Even further, the region of interest preferably is that portion of the image of the object where the biometric characteristic is presented in a manner that allows for reliably identifying the user when using this portion of the image, specifically this portion of the object or this portion of the biometric characteristic. For example, although the whole fingertip carries the fingerprint, taking an image of the fingertip would lead to some part of the fingertip not facing towards the optical sensor and thus being visible on the image with an inclination and, for example, being darker than other portions of the fingerprint. Those "obscured" regions are usually not part of the region of interest because they are actually not suitable to identify the user using these regions.

The neural network, according to embodiments of the present invention, is trained and/or otherwise adapted to be able to distinguish, through processing of the image, between those portions of the image that contain the region of interest and other portions of the image that do not contain the region of interest. This can be achieved in variety of ways and is thus not to be understood in a limiting way. That the neural network "distinguishes" that region comprising the ROI from another region is to be understood as the ability of the neural network to provide an output that distinguishes between the ROI and other regions of the image or makes it possible to distinguish between those regions. For example, the output could be an indication of pixels comprising the ROI but not other regions of the ROI. In any case, the outcome of the processing of the image by the neural network at least comprises that a first portion of the image comprising the region of interest is identified as different from another portion of the image. In this regard, it is noted that the specific size, shape of position of the region of interest is found out by the neural network during processing of the image and it is not preset.

In view of this, the method according to embodiments of the present invention is intended to be directed to a free-form taking of an image of the object, meaning that the image of the object is not taken using a template or other mask presented to the user defining how the user has to position the object relative to the optical sensor.

The identification means can either be remote to the mobile device with which the image is taken or it can also be included in the mobile device. Additionally, it is noted that the neural network can either be provided on the mobile device or remote to the mobile device which will then comprise that the image, before processing by the neural network, is forwarded from the mobile device to the remote location where the neural network is provided.

It is noted that providing the image or part of the image to the neural network does not only comprise the provision of the image or the part of the image as it was obtained by the optical sensor, meaning that, for example, the original image or half of the image or a specific portion of the image that is most likely to comprise the object having the biometric characteristic is provided to the neural network. Additionally, this step can comprise a pre-processing of the original image by, for example, applying modifications in the brightness or separation of the image into single colour images or the like. The embodiments of the present invention are not limited in this regard.

The method according to embodiments of the present invention allows for obtaining the region of interest for further processing, specifically for determining whether the extracted biometric characteristic identifies the user with high accuracy, thereby significantly reducing the data transfer necessary and also simplifying the processing of the biometric characteristic by the identification means as interfering influence to the identification means from the remainder of the image not carrying the region of interest can be avoided.

In one embodiment the object is at least one fingertip and the biometric characteristic is a fingerprint of the fingertip and wherein processing the input by the identification means comprises extracting, from the fingerprint, a biometric feature, such as for example the location and kind of the minutia, and comparing the extracted biometric feature to a biometric feature stored in a storage device, wherein if a difference between the extracted biometric feature and the stored biometric feature is below a threshold, the identification means determines that the user is identified by the fingerprint and, if the difference between the biometric feature and the stored biometric feature is above a threshold, the identification means determines that the user is not identified by the fingerprint.

The threshold, can, for example, be a numeric value. For example, the threshold can be a number between 0 and 1 where 0 would constitute perfect match between the biometric feature in the stored biometric feature and 1 would mean no match between the biometric feature in the stored biometric feature. In order to take into account that, with obtaining an image, there is always the risk that the match is not 100% but also taking into account that, in order to identify a user, the accuracy of identification should be very high, for example when the user wants to access his bank account, the threshold can be set close to 0, for example or 0.02 or 0.04. Any other value is, however, also possible.

The difference between the extracted biometric feature and the stored biometric feature can, for example, be calculated on a pixel per pixel bases of the region of interest used of the obtained image. This means that, for each pixel, the difference between the value of the stored biometric feature (for example brightness value or colour value) to the extracted biometric feature can be determined. Each of these values can then, for example, be normalized to a range between 0 and 1. If the mean value of these normalized values for all pixels in the ROI or a subset of pixels in the ROI is below the threshold, the identification means can determine that the user is identified by the fingerprint and, if not, the user is not identified by the fingerprint.

Other means for calculating the difference between the extracted biometric feature and the stored biometric feature can also be thought of.

Using this calculation and comparison to a threshold allows for reliably determining whether or not the user should be identified by the biometric feature obtained.

In a more specific realization, the image comprises more than one fingertip and the method further comprises extracting portions of the image corresponding to each fingertip in the image and using the fingerprint of each fingertip for identification of the user by the identification means.

This embodiment can be advantageous in order to increase the accuracy with which the identification of the user is performed as more than one fingertip is used for the identification.

It can further be provided that the identification means determines that a user is identified by the fingerprints of the fingertips by determining that a combined identification accuracy of the fingerprints of all fingertips in the image is above a given threshold or the identification means determines that a user is identified by the fingerprints of the fingertips by determining whether, for each fingertip, a difference between a biometric feature of the fingerprint of the fingertip and a stored biometric feature of the fingerprint of the fingertip is below a threshold and determining that the user is identified by the fingerprints of the fingertips only in case all determined differences are below the corresponding threshold.

The threshold can be determined as indicated above. Likewise, the difference between the biometric feature extracted and the stored biometric feature can be determined as already described above or in any other suitable manner.

By using the isolated differences between that biometric feature extracted and the stored biometric feature or by using the combined identification accuracy, the identification of the user can be performed with high reliability. In this regard, the combined identification accuracy can be considered to be, for example, the mean value of all identification accuracies obtained for the different fingerprints.

In one embodiment the image is obtained by a camera as optical sensor of the mobile device.

As all smart phones of the present generation have such cameras, the method can be used by a plurality of users, thereby simplifying the identification necessary for, for example, logging into a banking account.

In a further embodiment processing the image or the part of the image by the neural network comprises processing the image by an encoder to obtain an encoded image and, after that, processing the encoded image by a decoder to obtain a decoded output image.

In this regard, the decoder and encoder are not to be understood in the manner of "encrypting and decrypting". Instead, they have to be understood in the following way. The encoder processes the image in a "first direction", meaning that specific transformations are applied to the image in order to obtain a modified image (encoded image). This can comprise transformations that reduce the size of the original image and/or modify the values associated with each pixel or entry of a matrix representing the image. The decoder then applies a processing to the encoded image to obtain the decoded output image that, preferably, at least has the same number of pixels as the original input. In view of this, the decoder will, according to embodiments of the present invention, at least partially reverse the transformations applied by the encoder. However, the decoding of the encoded image does not necessarily result in the original input image such that the decoding and encoding are not inverse transformations that are applied to the image.

With this embodiment, it is possible to obtain the relevant information to identify the ROI in the image and mapping this identification to the original image in order to extract the relevant pixels.

In this regard, it can also be provided that the image or the part of the image provided to the neural network for processing comprises N×M pixels and the encoded image comprises n×m pixels, where n<N, m<M and the decoded output image comprises N×M pixels.

Reducing the number of pixels when encoding the image results in a loss of information. When enlarging the image once again during the decoding, however, the most relevant information to distinguish the ROI from other portions of the image can be more easily discernable as not relevant information or very detailed information that is not necessary for identifying ROI is faded out with this procedure.

More specifically distinguishing a portion of the image or the part of the image comprises distinguishing a portion of the decoded output image from another portion of the decoded output image.

The distinguishing of the portions in the decoded image can be much easier compared to distinguishing the portion comprising the ROI from another portion of the original image. Thus, the processing power required for distinguishing a portion in the decoded output image from another portion in the decoded output image are reduced significantly compared to processing the original input image.

In a further specific realization extracting the portion comprising the biometric characteristic comprises identifying pixels in the decoded output image that are within the distinguished portion (i.e. the ROI) and, after that, identifying the pixels in the decoded output image that are in the distinguished portion with corresponding pixels in the original image or the part of the image and extracting, from the original image or the part of the image, the corresponding pixels, the extracted corresponding pixels constituting the portion of the image or the part of the image comprising the biometric characteristic.

As the decoded output image has the same number of pixels as the input image, it is easily possible to match the portion identified in the decoded output image as comprising the ROI to the portion in the original image, thereby making it easier to extract the ROI from the input image.

The method may further comprise that, in the decoded output image, each pixel has a value $x \in ]-\infty; +\infty[$ and, before the distinguishing of a portion of the decoded output image, an activation function $S(x)=1/1+e^{-x}$ is applied to each pixel in the decoded output image and a normalized value $\bar{x}=S(x)$ is associated with each pixel in the decoded output image, wherein the distinguishing is performed on the pixels with the values x.

Thereby, portions comprising the ROI are even more easily distinguishable from other portions not comprising the ROI, thereby increasing the accuracy with which the ROI is identified in the decoded output image.

In one embodiment, the neural network comprises a set of encoder layers and a set of decoder layers, wherein processing the image or the part of the image by the encoder to obtain an encoded image comprises processing, by a first layer of the encoder, the input to create a first intermediate encoded output and processing, by each following layer of the encoder, the encoded output of the preceding layer, each encoder layer being a depthwise separable convolution comprising, in the processing order of the input within the layer, a depthwise convolutional layer, a first batch normalizer, a first rectified linear unit, a pointwise convolutional layer, a second batch normalizer and a second rectified linear unit;

wherein, by processing the input using the plurality of layers, the encoder obtains the encoded image;

wherein the encoded image is provided to the decoder and wherein processing the encoded image by the decoder to obtain a decoded output image comprises processing, by a first layer of the decoder, the input to create a first intermediate decoded output and processing, by each following layer of the decoder, the decoded output of the preceding layer, each decoder layer comprising a deconvolutional layer and/or a bilinear upsampling layer;

wherein, by processing the input encoded image using the plurality of layers, the decoder obtains the decoded output image. While, throughout this description, reference will be made to a "decoded" image and "encoded" image as well as "decoded output image" and "encoded input image", it is noted that those "images" may not be images as they would be normally understood. In fact, the image information will change due to the processing by the respective layers of the neural network in a way that the respective encoded and decoded "images" may no longer contain information commonly recognizable by humans. Therefore, the respective terms should rather be understood to only be used for explanatory purposes. The respective encoded and decoded "images" are, in general, tensors or matrices of a given size.

This arrangement of the encoder and the decoder yields advantageous results with respect to the decoded output image, allowing to accurately distinguish between the ROI and the other portion of the original input image or part of the image.

Moreover processing the image by the neural network comprises creating, from the image or the part of the image, at least one matrix l that represents a colour value for each pixel in the image or the part of the image and providing the matrix as input to the neural network, wherein the image or the part of the image comprises N×M pixels and the matrix l is a matrix comprising N×M values, wherein the entries of the matrix l are given by $I_{ij}$, where i and j are integers and i=1 ... N and j=1 ... M.

This allows for restricting the processing of the image before the processing by the neural network to the processing of a single colour value which can make the processing easier and the outcome more accurate.

Additionally, each depthwise convolutional layer of the encoder applies a predefined kernel K to a matrix A with entries $A_{ij}$ with i=1 ... $\overline{N}$ and j=1 ... $\overline{M}$, where $\overline{N} \leq N$, $\overline{M} \leq N$ received as input, the kernel K being a matrix of size S×T where S, T<N; S, T<M comprising entries $S_{ab}$, wherein applying the kernel to the matrix comprises calculating the inner product of the matrix K with each reduced matrix R of size $(N'M)_{S,T}$ of a matrix Z, where the matrix R has the same size as the kernel K, and the matrix Z has size $((N'2P_w) \times (M'2P_h))$ and the entries of the matrix $Z_{cd}$ with c, d ∈ $\mathbb{N}^+$ are given by $$Z_{cd} = \begin{cases} 0 \forall c \leq P_w \\ 0 \forall c > P_w + \overline{N} \\ 0 \forall d \leq P_h \\ 0 \forall d > P_h + \overline{M} \\ A_{ij} \text{ where } c = i + P_w; d = j + P_h; i = 1 \ldots \overline{N}; j = 1 \ldots \overline{M} \end{cases}$$

and provide a matrix P as output, wherein the matrix P has the size $$\left(\frac{\overline{N} - S + 2P_w}{W_w} + 1\right) \times \left(\frac{\overline{M} - T + 2P_h}{W_h} + 1\right),$$

where $W_w$ and $W_h$ define the stride width and each entry $P_{ij}$ of the matrix P is the value of the inner product of the ij-th reduced matrix R with the kernel K, wherein the matrix P is provided as output by the depthwise convolutional layer.

The entries of the kernel can be trained through the training of the neural network in order to lead to most appropriate results when processing the image with the help of this depthwise convolutional layers.

In a further realization, each depthwise convolutional layer of the decoder is adapted to apply an inverse transformation to the input received, the inverse transformation creating, from an input matrix B of size N'×M' with entries $B_{ij}$, an expanded matrix B by expanding each entry $B_{i,j}$ of the matrix B by multiplying the entry with a kernel $\overline{K}$, the kernel $\overline{K}$ being a matrix of size $\overline{S} \times \overline{T}$ with entries $\overline{K_{qp}}$, to a submatrix $\overline{B^{sub,ij}}$ with entries $B_{qp}^{sub,ij} = B_{ij}\overline{K_{qp}}$, and combining the submatrices $\overline{B_{qp}^{sub,ij}}$ to obtain the expanded matrix B.

With this, the encoded image can be decoded to the original size of the input image. The entries in the kernel $\overline{K}$ are not necessarily inverse or identical or otherwise related to the entries in the original kernel applied by the depthwise convolutional layer of the encoder. The entries in the kernel $\overline{K}$ can be learned during the training of the neural network to lead to the most accurate results.

The combining of the submatrices $B_{qp}^{sub,ij}$ can be facilitated in any appropriate way. For example, the submatrices can be arranged side by side to obtain the expanded matrix $\overline{B}$. They can also be arranged in an overlapping manner such that the part of a first submatrix overlaps a part of another submatrix when constructing the expanded matrix $\overline{B}$.

By this transformation, an expanded matrix can be obtained that, at the end, has the original size of the input image, thereby making the identification of the ROI easier.

In an embodiment the size of the kernel K and $\overline{K}$ is equal for all depthwise convolutional layers and/or at least one of the entries in the kernel K or $\overline{K}$ is different from another entry in the kernel.

When using kernels K and $\overline{K}$ having the same size, it is possible to obtain an expanded matrix $\overline{B}$ using the same number of expansion/decoding steps in the deconvolution as that used during the encoding of the image used in the convolution to obtain the reduced matrix. This can reduce artifacts and conflicts due to different numbers of transformations being performed by the encoder and the decoder. The values of specific entries in the kernel are most preferably learned during the training of the neural network.

In a further embodiment the batch normalizer creates a normalized reduced matrix P' and the rectified linear unit applies a rectification function to entries $P''_{ij}$ wherein the rectification function calculates a new matrix $\overline{P}$ with entries $$\overline{P}_{ij} = \begin{cases} 0 \forall P''_{ij} < 0 \\ P''_{ij} \forall P''_{ij} \geq 0 \end{cases}$$

and the matrix $\overline{P}$ is provided as output; and/or wherein the pointwise convolutional layer applies a weight α to a matrix received from a preceding layer by multiplying each entry in the matrix with the weight α.

Thereby, further information is lost during the encoding procedure but the most relevant information is forced through the processing of the input image by the neural network because the parameters of the neural network are correspondingly trained.

The method can also comprise providing a part of the image to the neural network, comprising separating the image into a grid comprising Q×R grid cells, wherein at least one bounding box is created within each grid cell, the bounding box having a predetermined position within the grid cell and predetermined geometrical characteristics, modifying the position and the geometrical characteristics of the bounding box to obtain a resulting bounding box, wherein the resulting bounding box is the bounding box having a resulting position and resulting geometrical characteristics that most closely match a location of the object and providing pixels of the image included in the bounding box to the neural network as part of the image.

Thereby, the original image can be reduced to a portion of the image constituted by the bounding box in fact comprising the object with the biometric characteristic. Thereby, the further processing of the input image by the neural network can be simplified as not the whole image but only the part of the image comprising the biometric characteristic is processed for identifying the ROI. Thereby, computer resources are saved and the accuracy can be increased.

Further the position of the bounding box can be calculated relative to a center of the grid cell in two dimensions and the geometrical characteristics of the bounding box can comprise a height and a width of the bounding box, wherein, further, a probability of the object being within the bounding box is associated with each bounding box.

Thereby, the bounding boxes can be reasonably adapted to the size and position and orientation of the object.

In one embodiment, each step of the method is performed on the mobile device.

This allows for a decentralized processing of images used for identification which can result in reduced vulnerability of data as only a single mobile device can be attacked or corrupted at a time which will then only comprise the data of a single user or at least a very limited number of users.

The mobile device according to embodiments of the present invention comprises an optical sensor, a processor and a storage unit storing executable instructions that, when executed by the processor of the mobile device, cause the processor to execute the method.

Embodiments of the present invention focus on the extraction of a region of interest (ROI) from an image taken from an object of the user, where the image comprises a biometric characteristic that could be used to identify the user. Such an object can be anything like a fingertip of one or more fingers of a hand of the user, the palm creases of a hand of the user or the face of the user or even the eye or the foot of the user. Each of these entities is known to carry biometric characteristics that can be used for identifying a user. For example, the fingerprint of a user is commonly known to be usable for identifying the user when using fingerprint scanners or taking ink images of one or more fingerprints of a potentially criminal person. While, in the following, a fingertip and a fingerprint will be used as explanatory examples, this is not to be construed as limiting the invention in any way. Instead of the finger and the fingerprint (more specifically, the minutia within the fingerprint), any other object mentioned so far and any other biometric characteristic can be used.

The method according to embodiments comprises the use of an optical sensor of a mobile device, like a smart phone, for obtaining the image of the object that has the biometric characteristic.

Such an image 110 is exemplarily provided at the left side of FIG. 1. Here, the finger 111 is shown in the foreground of the image 110. The finger carries the biometric characteristic in the form of the fingerprint 112 which comprises the minutia at the tip of the finger. As the image is taken with an optical sensor of the mobile device, like a camera, the image will usually comprise additional objects 113 to 118. These objects can be anything, like other persons, cars, houses, vegetation and streets or any other infrastructure.

If this image would be provided to an identification means like another software or hardware for processing biometric characteristic, this could and most likely would lead to failures in identifying the user as the respective software/hardware does not know how to discriminate between portions of the image that comprise the biometric feature in a way that it can be used for identification of the user (here and after referred as the region of interest) and other portions of the image. Further, even if such identification means (like log-in servers) would be adapted to process such images in a proper way to still identify the user, this would require significant computing resources at these identification means only for identifying the ROI that actually comprises the biometric characteristic and distinguish it from the rest of the image.

It is, therefore, more appropriate to only provide the information to the identification means that is actually necessary to identify the user, i.e. the ROI or the biometric characteristic within the ROI.

In view of this, it is an aim of embodiments of the present invention to process the original image in a way that a modified image or part of the image 120 is obtained in which the ROI 122 is extracted or separated or otherwise distinguished from anything else in the image (herein referred to as 121).

The resulting image 120 may thus either only comprise the ROI 122 or may comprise a square or rectangular region in which the ROI is embedded. The later realization can be easier to handle because it can be represented in the normal way the images are represented by using a number of pixels, for example, 1024×1024 pixels or 198×198 pixels or any other suitably number of pixels.

As the images 110 taken by the optical sensor of the mobile device will usually differ from each other in view of what is actually shown on the image and they will also differ with respect to the visibility and position of the object that has the biometric characteristic (like the finger), the ROI cannot be easily determined by, for example, providing a preset mask over the image that distinguishes a first portion of the image from another portion of the image.

In view of this, it is a finding of embodiments of the present invention that, by training a neural network with proper input as will be described later, it is possible to process an originally input image 110 or a part of the image 110 in a way that the ROI can be reliably separated from the remaining portions of the image.

Figure 2:
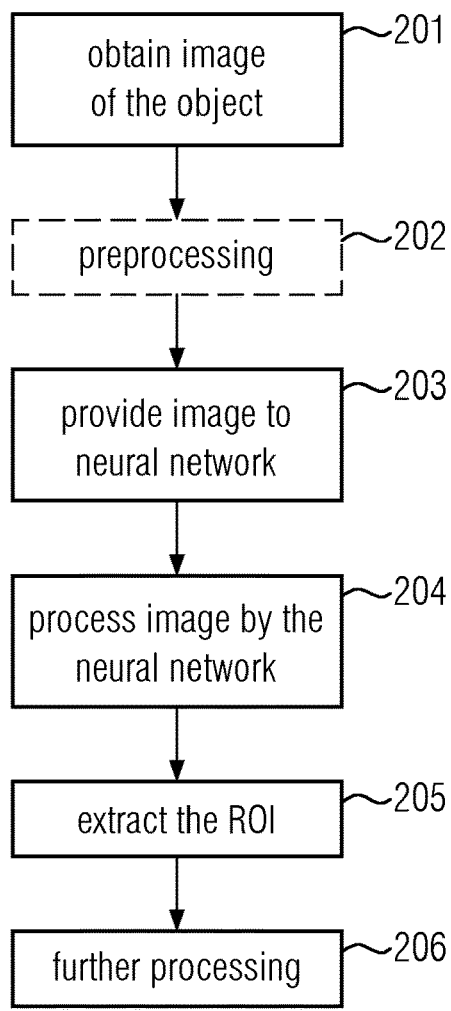
FIG. 2 is a flowchart of a method according to one embodiment.

The process according to one embodiment of the invention that facilitates this extraction of the ROI from other portions of an image is briefly shown and explained in FIG. 2.

More specific explanations regarding the separation steps will be provided in the following figures.

In the first step, the method comprises obtaining 201 an image of the object that has a biometric characteristic by using an optical sensor of a mobile device. The mobile device can be anything like a tablet computer, a laptop, a smartphone or even a mobile camera like a CCD camera. The obtained image is preferably obtained by using a free-form software/hardware component for taking images. This means, during taking of the image of the object, the user is not provided with a specific pattern or other instruction on how to arrange the object that has the biometric characteristic with respect to the optical sensor. In fact the user, according to embodiments of the present invention, is preferably completely free in how he takes the image of the object. This includes, for example, the lighting conditions and the relative arrangement of the object with respect to the optical sensor. Additionally, the user is essentially free in where he takes the image and what the background of the image actually is in addition to the object that has the biometric characteristic. Therefore, there may be other objects visible on the image as is exemplified in the image 110 of FIG. 1.

After the image has been obtained, there may optionally be some pre-processing at step 202 implemented for the image. This pre-processing can include, for example, modifying brightness/luma values or colour values. This pre-processing can also include separating the originally obtained image based on its colour values or brightness values by, for example, using the Hue-Saturation-Value method.

As an example, an original image is usually comprised of a number of pixels (for example 1024×1024) where, for each pixel, three colour values with associated brightness values are provided. This allows, during the pre-processing, to derive three images from the original image with identical number of pixels but where each image only comprises the pixel values associated with one colour value. After the pre-processing, there can thus be one image comprising the green colour values, one image comprising the blue colour values and one image comprising the red colour values. Also other pre-processing methods are possible as will be described later.

Specifically, the pre-processing can comprise examining (either by using the neural network or using any other software or even another neural network) the image and identifying a part of the image having a size that is smaller than the size of the original image in which the object that has the biometric characteristic is arranged.

Referring to the example of FIG. 1, the finger 111 with the fingertip is arranged almost in the middle of the image taken. Therefore, the pre-processing step 202 could comprise cutting of the border regions of the image 110 and only processing further a smaller part of the original image that still comprises the fingertip 112 with the biometric feature. This is identical to extracting, from the original image, only the center portion (for example in the form of a rectangle) comprising the fingertip.

In the following, reference will usually be made to "the image" or "the input image" or the "original image". In view of the foregoing, it is clear that this does not only comprise the full image or the original image obtained by the optical sensor but also any realization of the pre-processing, including using, instead of the full image, only a part of the image or using only one or more images comprising one colour value or being restricted to brightness values for the respective pixels. Any of these pre-processings and any other pre-processing that can be thought of will thus be considered included when the further processing of the original image is described.

Either after having obtained the image of the object or at least after the pre-processing of the image, the image (or a part of the image or the pre-processed image in general) is provided to a neural network for further processing in step 203. Providing the image to the neural network can be achieved by, for example, internally transferring the image from the optical sensor or the component that has carried out the pre-processing to the software component that implements the neural network. The providing of the image to the neural network can also comprise using data transmission means to transfer data between the mobile device and remote device. If the neural network is not implemented on the mobile device, as can be the case in some embodiments, the image is provided using, for example, mobile internet connections or a wired connection or Bluetooth or any other suitable connection to the remote location where the neural network is provided.

Providing the image for the neural network can also comprise extracting the image from a persistent or non-persistent storage on the mobile device and provide image to the neural network and, at the same time, storing the image in a persistent or non-persistent storage associated with the neural network in that the neural network can access this storage location.

In the next step, after the image has been provided at step 203 to the neural network, the image is processed at step 204 by the neural network. This processing can comprise processing the data associated with one or more pixels of the image by one or more nodes or one or more layers within the neural network, thereby, for example, transforming the input image in one or more specific manners as will be explained in more detail below. After 204 the processing of the image by the neural network at step 204, the neural network provides an output that distinguishes a portion of the image comprising the above-mentioned ROI, from another portion of the image, for example, the background of the image that does not have anything to do with the biometric feature. Likewise, this processing can result in a part of the object being considered to not belong to the region of interest. This can be the case, for example, if parts of the object that has the biometric characteristic do not have at least a portion of the biometric characteristic. This would be the case, for example, for the finger for every portion that is not the fingertip.

Likewise, the quality of a portion of the object that has the biometric characteristic can be too poor to use it for identification and, thus, this would not belong to the ROI. This can be true, for example, for portions in the object that have a part of the biometric characteristic but that are inclined with respect to the optical sensor and, when taking the image of the object, are thus not properly visible or are darker than the remainder of the image taken of the object, thus not allowing for using these parts of the biometric characteristic for identifying the user.

In any case, the processing will result in the neural network providing an output that distinguishes a portion of the image comprising the ROI from another portion of the image that does not comprise the ROI.

Upon this, the method according to one embodiment of the invention comprises extracting the ROI from the image (or the part of the image, respectively) at step 205. This extracting can comprise that only the pixels that carry the biometric characteristic within the region of interest are extracted from the image. This, however, can lead to a number of pixels that, together, form an unpredictable shape like an elliptical or circular shape as shown in the image 120 in FIG. 1. Such images can usually not be easily processed further as they do not have a size and shape that is usually used for representing images in data structures. Therefore, instead of extracting only the pixels corresponding to the region of interest and carrying the biometric characteristic of the user from the original image, it be provided according to one embodiment of the invention that every pixel in the original image that is not within the region of interest is set to a standard value (for example black or white). This will lead to the extracted region of interest being embedded within a plurality of surrounding pixels such that the resulting image has the usually used shape (for example rectangular and comprising 1024×1024 pixels). This can make processing of the extracted region of interest easier in consecutive steps.

Such consecutive steps are summarized in the further processing of the extracted ROI at step 206. This further processing of the extracted ROI (being it only the pixels of the region of interest itself or being it the pixels embedded within or surrounded by pixels provided with a standard value), can comprise storing of the ROI (or respective image) in a storage device that can be provided on the mobile device or remote to the mobile device. Additionally or alternatively this further processing at step 206 can also comprise providing the region of interest to an identification means that uses the region of interest in order to extract the biometric characteristic in the region of interest and processes the extracted biometric characteristic in order to determine whether the extracted biometric characteristic identifies the user.

For example, the identification means can be a log-in server for logging in into the bank account of the user. In order to identify himself, the user can then take an image of, for example, his fingertip and have it processing in a manner as described in relation to FIG. 2 in steps 201-205 and send (either manually or automatically) the respective image to the log-in server for logging in to the banking account. The server can then further process the region of interest of the respective data structure carrying the region of interest in order to determine whether or not the identification is successful.

Figure 3:
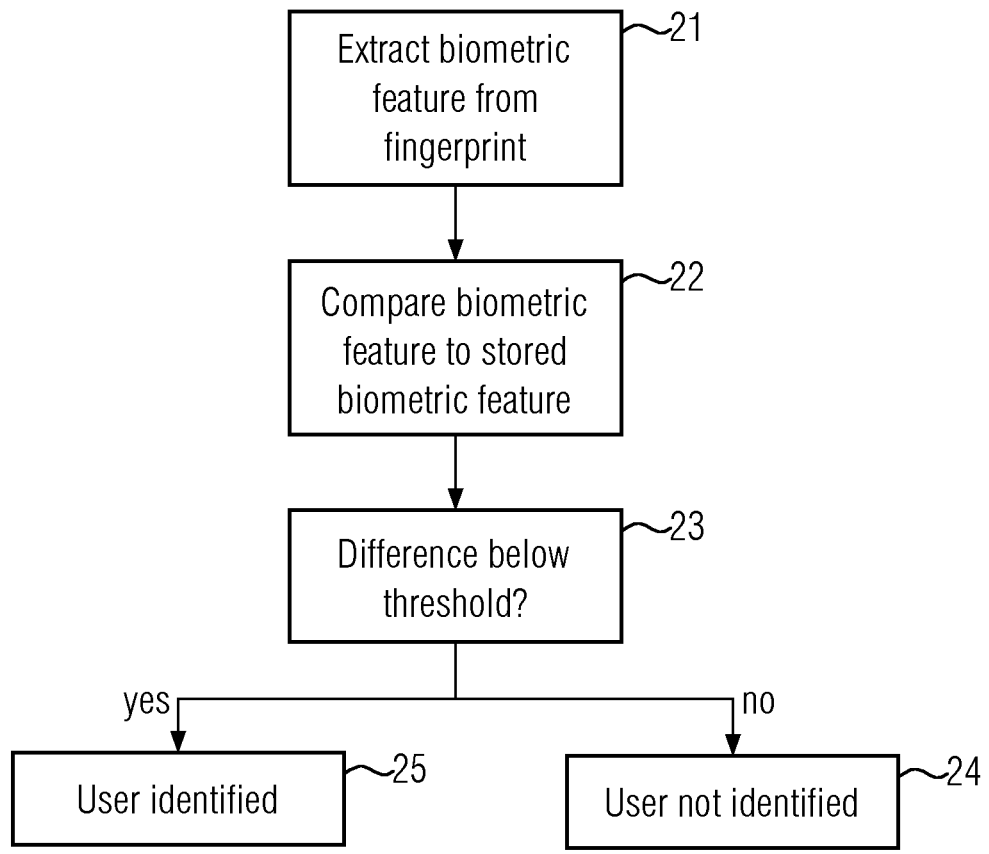
FIG. 3 is a flowchart of a method for identifying a user using an extracted biometric feature according to one embodiment.

The process of how this can be facilitated is described in further detail in FIG. 3 for one embodiment.

FIG. 3 shows a more detailed explanation of how a user may be identified using the biometric characteristic in the case the biometric characteristic being a fingerprint where the object would then be at least one fingertip. As explained above, other objects and biometric characteristics may likewise be chosen.

The method in FIG. 3 begins with step 21 where the biometric feature is extracted from the fingertip and, consequently, these steps are at least performed after the step of extracting, from the identified object, the biometric characteristic or the ROI, respectively, as explained in FIG. 2.

Extracting the biometric features from the fingertip may, for example, comprise extracting the location and the kind of minutia of the fingerprint. It can also comprise extracting only very specific kinds of minutia (for example the crossing of two or more lines in the fingerprint).

In order to identify the user using this information, it is of course necessary that a reference is available in the form of a corresponding biometric feature. For this reason, it may be the case that the identification means as explained previously with respect to FIG. 2 is associated with a storage device or comprises a storage device in which biometric features are stored for specific users. For example, for each user, a file may exist in which one or more biometric features are stored in the form of, for example, images, numerical values or other data structure.

In the next step 22, the biometric feature obtained from the fingerprint is compared to a correspondingly stored biometric feature. This can comprise in the case of the stored biometric feature being represented by a number of locations of the minutia comparing corresponding locations in the extracted biometric feature. Of course, other means for comparing an obtained biometric feature to a stored biometric feature are known and can be used, for example, image recognition technologies, frequency transformations or the like. Comparing the obtained biometric feature and the stored biometric feature is, according to embodiments of the present invention, done in such a manner that a degree of correspondence between the obtained biometric feature and the stored biometric feature can be calculated. In other words, this comparison will result in a difference between the stored biometric feature and the obtained biometric feature being calculated. This difference can be a single real number or a tensor or a vector or any other mathematical structure that is considered suitable to represent the degree of match or difference of the obtained biometric feature and the stored biometric feature. It can also be a difference image that is obtained by subtracting, from a stored biometric feature image, an obtained biometric feature image on a pixel per pixel basis.

A threshold can be provided that can be used for determining whether the obtained biometric feature corresponds to the stored biometric feature and thus, allows for identifying the user.

Correspondingly, in step 23, it is determined whether the difference between the obtained biometric feature and the stored biometric feature is below or above this threshold. If it is below this threshold, it is determined in step 25 that the user is identified by the biometric feature. If the difference is above the threshold, it is instead determined in step 24 that the user is not identified by the biometric feature. The threshold can be set, for example, to a number between 0 and 1 where 0 would be a perfect match (i.e. no difference) and 1 would represent no match at all. In order to take into account that the accuracy of the identification should be comparably high but to also take into account that taking a free-form image of the object as explained in FIGS. 1 and 2 will usually suffer from distortions, the threshold can be set to be close to 0 but to not be 0. For example, the threshold may be chosen to be smaller than 0.1, preferably smaller than 0.05, or even smaller or equal to 0.98. Other values are, of course, possible.

This determination will then result in the identification means determining either that the user is identified by the obtained fingerprint or the user is not identified by the obtained fingerprint.

FIGS. 2 and 3 have described the way of identifying the user using the biometric characteristic obtained from the originally taken image in the case only one fingertip is used for identifying the user and this fingertip was present in the image.

It is, however, also contemplated that the identification means may not only evaluate a single fingertip but may evaluate more than one fingertip like two fingertips or even all fingertips available on the image in order to identify the user. The manner in which a biometric feature obtained from a single fingertip or fingerprint of the plurality of fingertips is matched to a stored biometric feature by the identification means corresponds to the one described with respect to FIG. 3.

However, in case more than one fingerprint is evaluated, it may be that the user is either only identified in case a combined identification accuracy of the biometric features is above a given threshold or the user is only identified in case, for each fingertip obtained, the comparison of the obtained biometric feature with the stored biometric feature as explained in step 22 and 23 of FIG. 3 leads to the result in step 25.

The last case is straightforward as the method explained with respect to FIG. 3 is performed on every fingerprint in the image and only if the difference between the obtained biometric feature and the stored biometric feature for each obtained fingerprint is below the given threshold, the user is identified. In any other case, the user may not be identified.

However, in the case of the user is identified in case a combined identification accuracy of the fingerprints of all fingertips in the image is above a given threshold, it is not necessary that, for each fingertip, the comparison of the biometric feature obtained and the stored biometric feature results in the difference being below the threshold in line with step 23 of FIG. 2.

For example, considering the identification accuracy of a biometric feature to be number ranging from 0 (no identification) to 1 (complete match between the obtained biometric feature and the stored biometric feature), the combined identification accuracy may have a value of less than four (corresponding to perfect identification accuracy for four fingerprints) in case the combined identification accuracy is determined by the sum of the isolated identification accuracies obtain for each biometric feature alone.

For example, the corresponding threshold for the combined identification accuracy may be 3.5. In this case, it will be sufficient to identify the user in case, for example, the identification accuracies for each fingerprint is approximately 0.9 since the sum of those identification accuracies (i.e. the combined identification accuracy) is 3.6 and, hence, above the respective threshold. As another example, considering that three fingerprints are identified with an identification accuracy of 0.95, it will be sufficient if the fourth finger is only identified with an accuracy of 0.75.

It is noted that the identification accuracy can be seen as the relative degree of similarity or correspondence between the obtained biometric feature and the stored biometric feature. Thus, in case the obtained biometric feature corresponds to 90% to the stored biometric feature, the identification accuracy (i.e. how accurate the user might be identified with this biometric feature) will be 0.9.

It is clear that also other values for the identification accuracy or even also other values for the threshold can be used. Furthermore, there are also other means how the combined identification accuracy can be determined. For example, the combined identification accuracy may be calculated by determining the mean value of the identification accuracies or by determining the product of the identification accuracies.

In the figures that follow, the processing of the originally obtained image for finally extracting the ROI comprising the biometric characteristic in line with steps 12 to 14 will be described in more detail and, further, an explanation regarding how the neural network can be trained to be able to identify fingertips with high accuracy will be given.

As already explained above, an obtained image is processed by the neural network by first processing the image using an encoder (as will be explained in FIG. 4) and then processing it by a decoder (as will be explained in FIG. 5).

Figure 4:
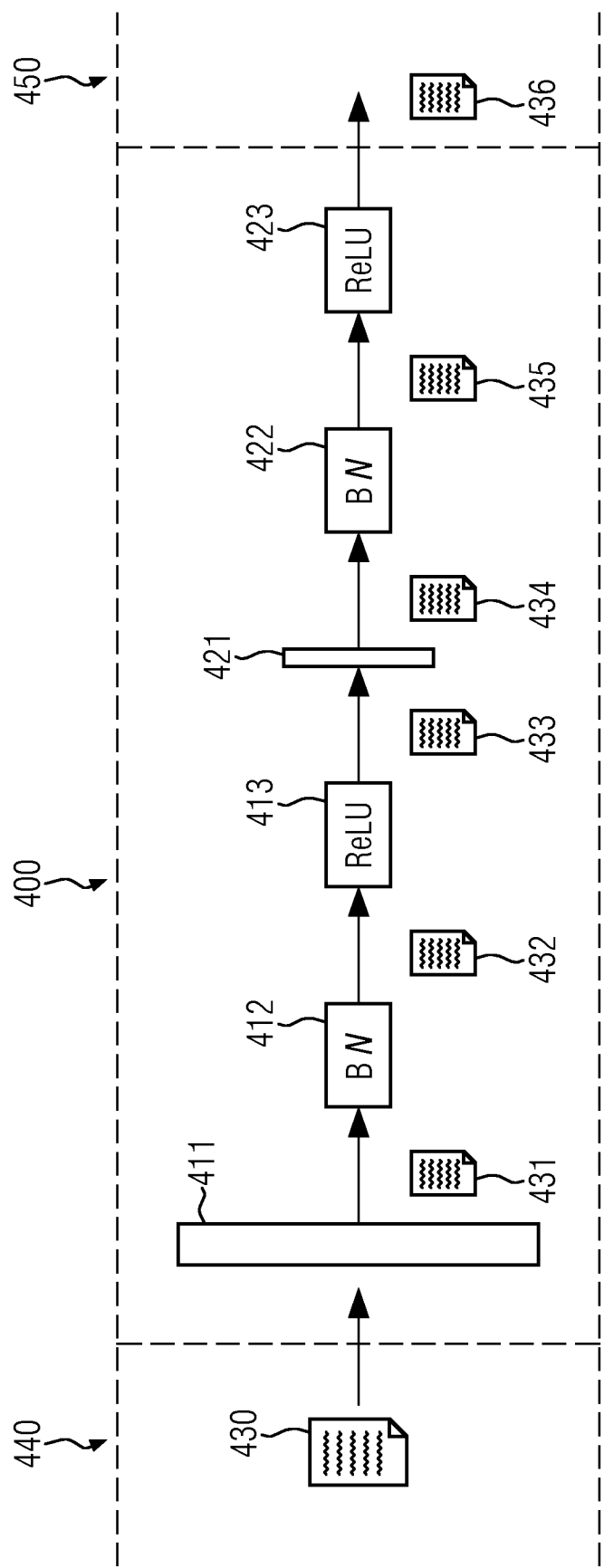
FIG. 4 is a schematic depiction of the processing of an input image by the encoder according to one embodiment.

FIG. 4 shows the internal processing of a received input in one layer 400 of the encoder of the neural network according to one embodiment of the invention. This layer 400 may be a layer that is, in processing order of the original input through the encoder, the first layer that receives the original input after step 202 explained above or any intermediate layer that is arranged between two further layers 440 and 450 of the neural network or the layer 400 may even be the last layer of the neural network that will, in the end, provide an encoded output that is then provided to the decoder.

In any case, the layer 400 will receive an input 430 that at least somehow corresponds to the originally obtained image. This input is preferably provided in the form of at least one matrix that has the dimension N×M where N and M are integers greater than 0. The matrix may, for example, represent the pixels in the image for at least one color value (for example red). The entries in this matrix thus may have values that correspond to the value of the respective color (in the example case red) of this specific pixel. As will be clear from the following, the input may not be identical to the obtained image but can be a matrix P that was obtained from the matrix representing the original image by some processing through layers in the neural network or even by some pre-processing (for example reduction in resolution, a single color or brightness value or the like).

For ease of discussion, however, the input 430 will be assumed to correspond to the N×M matrix that represents the originally obtained image and each entry in this N×M matrix corresponds to a value of a color (for example red) of a pixel in the respective image. Applying this teaching to any other transformed matrix that originates from the original N×M matrix and is obtained through processing this matrix in layers of the neural network is straightforward.

Following now the process exemplified in FIG. 4, the input 430 is received by the depthwise convolutional layer 411 for processing. In the following, a comparably simple example will be given with respect to how the input matrix 430 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers and smaller than N and M.

Furthermore, it will be assumed that only the original input matrix l (i.e. the input matrix 430) of size N×M is used for calculating the inner product with the kernel. It is, however, also contemplated that an extended matrix Z can be used for calculating the inner products with the kernel. This extended matrix Z is obtained by "attaching", to the original matrix l, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix L. The resulting matrix will thus be of size (N'2$P_w$)×(M'2$P_h$). In view of this, the matrix Z will have the following entries:

$$Z_{cd} = \begin{cases} 0 \forall c \leq P_w \\ 0 \forall c > P_w + N \\ 0 \forall d \leq P_h \\ 0 \forall d > P_h + M \\ I_{ij} \text{ where } c = i + P_w; d = j + P_h; i = 1...N; j = 1...M \end{cases}$$

In this context, it follows that the new matrix obtained by calculating all inner products and arranging them properly according to lines and rows will generally be of size $$\left(\frac{\overline{N} - S + 2P_w}{W_w} + 1\right) \times \left(\frac{\overline{M} - T + 2P_h}{W_h} + 1\right),$$

where $W_w$ and $W_h$ define the stride width in the direction of lines and the direction of the rows, respectively. It is clear that only those paddings and those stride widths are allowed for a given kernel K with size S×T that result in integers for the size of the new matrix. Furthermore, the stride widths $W_w$ and $W_h$ are preferably equal or smaller than S and T, respectively, as otherwise the kernel would be moved over the original matrix 1 in a manner that some lines or rows of the original matrix 1 are left out in calculating the new matrix.

For ease of discussion, it will be assumed in the following that no padding is provided to the original matrix 1 and the stride width is 1 for horizontal and vertical strides. Furthermore, it will be assumed that the kernel is a matrix with size S×S, i.e. the special case where S=T will be assumed. Applying the explanations given below to arbitrary padding and stride width as well as to any kernel size is straight-forward with the teaching provided below.

In the depthwise convolutional layer 411, the received input matrix 430 is used to form an inner product with the kernel K that has the size S×S where S<N, M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1, 2, 3; j=1, 2, 3 such that the reduced matrix $(N'M)_S$ is comprised of nine entries and the inner product with the kernel K is calculated which results in a single number. The next reduced matrix in the directions of the lines of the original N×M matrix is the matrix where i is increased by 1 (corresponding to the stride width), such that the next matrix in this direction is constituted of the items in the original N×M matrix where i=2, 3, 4; j=1, 2, 3. This matrix may then be used for calculating the next inner product with the kernel. It is noted that the given example of the S×S matrix with S=3 is only one example and other kernels may also be used.

In order to calculate the next reduced matrix R of the size $(N'M)_S$ in the direction of the rows/columns, the index j of items in the original N×M matrix is increased by 1. This is done until the last reduced matrix in the direction of the lines where i=N−S+1, N−S+2, N−S+3 in the case for S=3. For the rows, this is done in a corresponding manner where j=M−S+1, M−S+2, M−S+3. By calculating those inner products, a new matrix, the matrix P is calculated that has the size (N−S+1)×(M−S+1). Its entries $P_{i,j}$ correspond to the respective inner product calculated with the corresponding reduced matrix of the original N×M matrix and the kernel K. It is noted that a matrix of this size will, in fact, be forwarded to the pointwise convolutional layer of the layer 400.

The kernel K constitutes entries that are obtained through a learning process where the neural network is trained in order to properly identify the intended objects. The kernel K used in the layer 400 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 430 by the depthwise convolutional layer is the matrix 431 having, as explained above, size (N−S+1)×(M−S+1) in case the kernel is moved in strides over the original N×M matrix that have a distance of Δi=1 in the direction of the lines and Δj=1 in the direction of the rows (this corresponds to the respective stride width). In case, however, those strides have a larger distance like Δi=2 or Δi=3 (and potentially, correspondingly for the rows), the dimension of the result 431 will change correspondingly as explained above.

In the further processing, this result 431 is forwarded to the first batch normalizer 412 that follows in the processing order depicted with the arrows in FIG. 4 after the depthwise convolutional layer 411. The batch normalizer attempts to normalize the received result matrix 431. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1) matrix (denoted as P in the following, with corresponding items $P_{i,j}$ matrix is given as $$V = \frac{\sum_{ij} P_{ij}}{n \cdot m}$$

n and m represent the number of lines and columns/rows in the N×M matrix or the number of lines and columns in the matrix P. The items $P_{i,j}$ are the entries of the matrix P where a given item $P_{i,j}$ is the element in the matrix in line l and column j.

The batch normalizer then calculates a reduced matrix P' by subtracting, from each entry $P_{i,j}$ in the original matrix, the mean value V such that $P'_{ij}=P_{i,j}-V$. Thereby, the values in the reduced matrix P' are normalized such that anomalies in the one or the other direction (extremely large values or extremely low values) are filtered out.

The result 432 created by the first batch normalizer 412 is a matrix still having (in the example given in FIG. 4) the size (N−S+1)×(M−S+1) since, until now, no further dimensional reduction of the matrix was performed.

The result 432 is then provided to the first rectified linear unit 413 that follows the first batch normalizer 412.

The rectified linear unit modifies each entry in the matrix 432 further by calculating new matrix entries $\overline{P}_{i,j}$ where $$\overline{P}_{ij} = \begin{cases} 0 \ \forall \ P'_{ij} < 0 \\ P'_{ij} \ \forall \ P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 433 thus output by the first rectified linear unit 413 still is a matrix of shape/size (N−S+1)×(M−S+1) and this matrix is forwarded to the pointwise convolutional layer 421.

This pointwise convolutional layer 421 creates a result 434. This result 434 is created by the pointwise convolutional layer 421 by taking each entry in the (N−S+1)×(M−S+1) matrix 433 and multiplying this entry with a weight α. The weight α preferably is a number that is greater than 0 in any case and this number is identical for each entry in the (N−S+1)×(M−S+1) matrix. The result 434 that is obtained from the pointwise convolutional layer 421 thus is a matrix having the same size (N−S+1)×(M−S+1) but where each entry is multiplied with the weight α.

Figure 5:
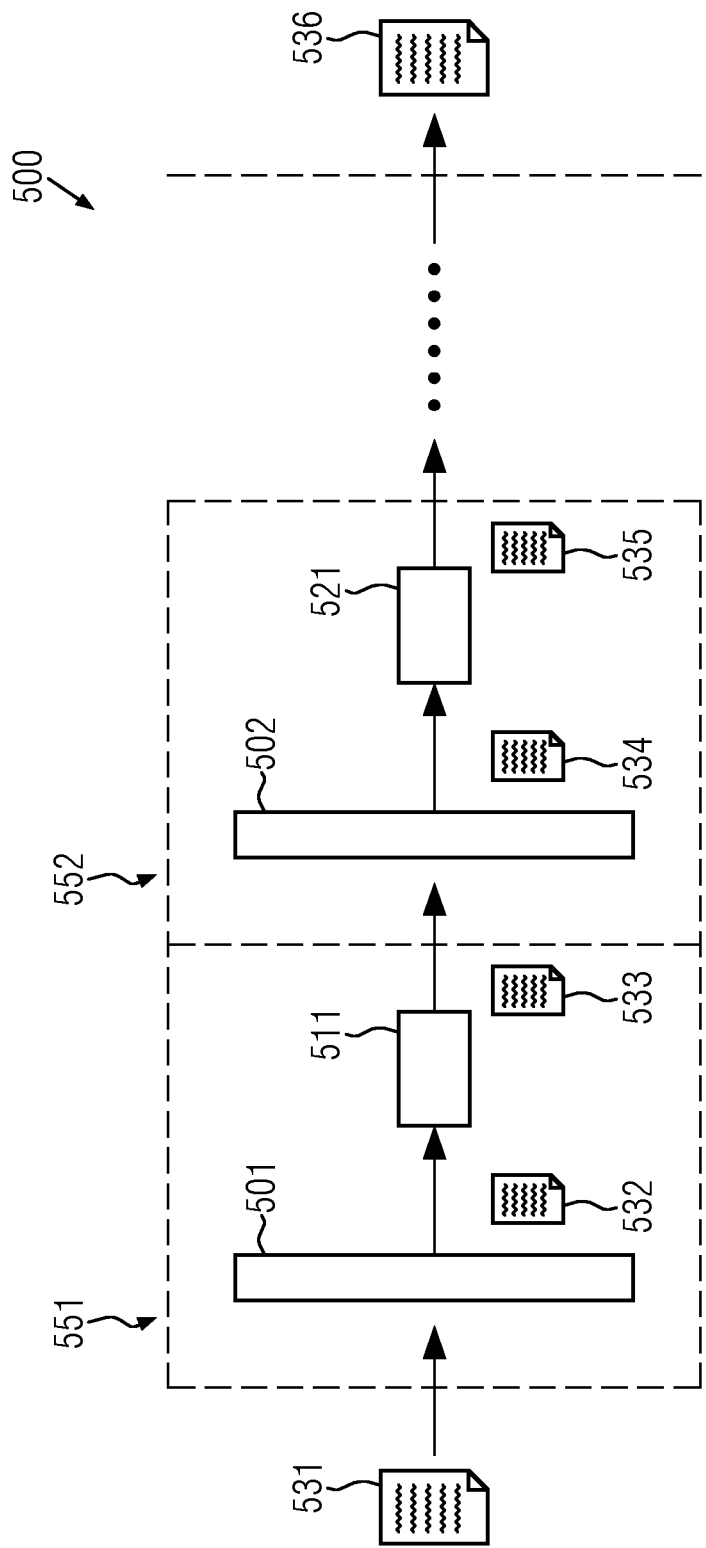
FIG. 5 is a schematic depiction of the processing of an encoded image with the decoder of the neural network according to one embodiment.

The result 434 is then provided to the second batch normalizer 422 where it is normalized in the manner as explained for the first batch normalizer 412 and a normalized matrix P' of the same dimension as the result 435 is calculated and this matrix 1 result 435 is forwarded to the second rectified linear unit 423 where a rectification function is applied to obtain a result/matrix $\overline{P}$ 436 that is then forwarded to the next layer in the neural network or, if no other layer follows in the neural network, the result 436 is provided as an output encoded image to be processed by the encoder as will be described in FIG. 5.

It is noted that, through the processing in the encoder, information that was available in the original image obtained by the optical sensor is lost since some of the transformations t applied in the encoder do not have an inverse transformation $t^{-1}$ for which the relation $t°t^{-1}=1$ would hold. This, however, in fact is a result intended by embodiments of the present invention since, through the training of the neural network described below, it is possible to limit or restrict this information loss basically to information that is not of interest, i.e. does not define the ROI. While this information is lost, the informational weight of the ROI is increased, thereby making the distinguishing of the ROI from remaining portions of the image possible.

It is a finding of embodiments of the present invention that, for identifying fingertips, thirteen layers that are identical to the layer 400 explained in FIG. 4 are most appropriate as they result in a comparably high identification accuracy of the fingertips and their location while only requiring reduced computer resources for implementation of the respective method which makes it more applicable to mobile devices.

With respect to FIG. 5, the process executed in the decoder upon receiving an encoded image form the encoder is described.

As already indicated for the encoder, the decoder should not be seen in the sense of "decoding" something in a manner that an encryption is decoded that was previously applied to an object. Rather, the decoder should be understood as a part of the neural network comprising one or more nodes or layers that expand the encoded image or at least transform the encoded image in a manner that after processing the encoded image by the decoder, the decoded output image has a size (in terms of pixels or entries in a matrix) that preferably corresponds to the original input image. If, for example, the original input image had a size of A×B pixels, the decoded output image (or tensor) preferably also has the same size and number of pixels. As these can also be described in a form of a matrix (or tensor, more specifically) where each pixel is associated with an entry in the matrix and the value of the pixel is the value of the entry in the matrix, it is equivalent to say that the decoded output image in the form of a matrix has the size of the original input image. As an example, the original input image may have a size of 224×176×3 (the 3 corresponds to the number of color values). The decoded output image then has the same number of pixels/entries in the matrix constituting the decoded output image. Also other resolutions of the original input image (also comprising other numbers of color values) can be thought of.

As can be seen in FIG. 5, the decoder 500 comprises one or more layers 551 and 552 (as well as other corresponding layers not shown) through which the encoded input image 531 is processed one after the other. This means that the encoded input image 531 is first processed by the first layer 551 of the encoder 500 and the intermediate decoded image 533 is then provided to the next layer 552 in the processing order of the encoded image in the encoder 500 of the neural network. After having passed through each layer of the encoder, a final decoded output image 536 is provided. This can then be processed further as will be described in further detail below.

As regards the processing of the encoded image by the layers 551 and 552, it is firstly noted that each of these layers comprise identical components which, in principle, is a deconvolution also called transposed convolution 501 and 502 and bilinear upsampling units 511 and 521. While the bilinear upsampling units are shown in processing order within the layer after the deconvolutions 501 and 502, it is also possible to provide the bilinear upsampling units in processing order of the input encoded image before the convolutions 501 and 502.

The deconvolutions 501 and 502 work in a manner that reverses the transformation of the convolutions.

In order to explain this in more detail, in is assumed that the encoded input image 531 (or any intermediate decoded image 533 and 535) is represented in the form of an input matrix B with a specific size N'×M' where the entries in this input matrix are denoted with $B_{ij}$, where i≤N' and j≤M'.

In order to obtain, from this input matrix, an expanded matrix $\overline{B}$, each entry in the matrix is multiplied with a kernel $\overline{K}$ that has, like a kernel in the depthwise convolutional layers of the encoder, the form of a matrix with a specific size $\overline{S}×\overline{T}$. For ease of discussion, it is assumed that $\overline{S}=\overline{T}$. This, however, is not limiting in any sense. In fact, any value of $\overline{S}$ and $\overline{T}$ is possible. This includes that $\overline{S}$ and $\overline{T}=S$ and T of the kernel used in the encoder or $\overline{S}$ and/or $\overline{T}$ are different from S and/or T used in the encoder.

By multiplying an entry $B_{i,j}$ of the original input matrix (like the encoded image 531) with the kernel, a submatrix $\overline{B}^{sub,ij}$ with specific entries is provided. Considering a kernel $\overline{K}$ with entries $\overline{K}_{qp}$, the entries in the submatrix $\overline{B}^{sub,ij}$ are denoted with $\overline{B}_{qp}^{sub,ij}$. These are calculated by the product $B_{ij}\overline{K}_{qp}$.

By this, a single entry in the input matrix B is expanded to a submatrix with size $\overline{S}×\overline{T}$. The values of the entries $\overline{B}_{qp}^{sub,ij}$ do not only depend on the entry in the matrix B but it also depend on the entries $\overline{K}_{qp}$ of the kernel $\overline{K}$. Following this procedure for each entry $B_{i,j}$ will lead to $\overline{ST}$ submatrices $\overline{B}_{qp}^{sub,ij}$.

Those values $\overline{K}_{qp}$ can be obtained through the training of the neural network as will be explained in further detail below. Though it would, in principle, be possible to provide different kernels $\overline{K}$ depending on the indices i and j of the entry $B_{i,j}$ of the input matrix, it will be assumed, for ease of explanation, that each kernel K used is identical within the deconvolution. This means that each kernel $\overline{K}$ has the same size $\overline{S}=\overline{T}$ and as the same entries $\overline{K}_{qp}$ ∀q, p. However, for another deconvolution in the encoder, this might not be the case and the kernel may have a different size and/or different entries.

Returning to the calculated submatrices $\overline{B}_{qp}^{sub,ij}$, the further procedure is as follows. For each entry $B_{i,j}$ of the input matrix B, submatrices are calculated as explained above. In order to obtain a reasonable output form the deconvolution, those submatrices are combined in a specific manner in order to obtain an expanded matrix $\overline{B}$. This can be achieved in a plurality of ways.

For example, the submatrices can be "stuck together". This means, a first submatrix $\overline{B}_{qp}^{sub,ij}$ is combined with a submatrix $\overline{B}_{qp}^{sub,i+1,j}$ to the right of the submatrix $\overline{B}_{qp}^{sub,ij}$ and another submatrix $\overline{B}_{qp}^{sub,i,j+1}$ directly below the submatrix $\overline{B}_{qp}^{sub,ij}$. Additionally, a submatrix $\overline{B}_{qp}^{sub,i+1,j+1}$ is provided diagonally. In this manner, the expanded matrix is provided by continuing this pattern for all original entries $B_{ij}$ in the input matrix and the corresponding submatrices, starting the pattern with $B_{00}$.

Alternatively, it is also possible to combine the submatrices $\overline{B}_{qp}^{sub,ij}$ with an overlap. This means that the submatrices are not attached to each other in a manner as explained above but the submatrix $\overline{B_{qp}^{sub,i,j}}$ and the submatrix $\overline{B_{qp}^{sub,i+1,j}}$ are combined by only shifting the submatrix $\overline{B_{qp}^{sub,i+1,j}}$ relative to the submatrix $\overline{B_{qp}^{sub,i,j}}$ with a stride width W that is smaller than the size $\overline{S}$ of the respective kernel (as was the case in the previous paragraph). Thereby, in the resulting expanded matrix $\overline{B}$, the entries result from combinations of one or more submatrices $\overline{B_{qp}^{sub,i,j}}$. It is clear that this overlapping can be provided in any direction. This means it can be provided (considering a matrix representation) from the left to the right, from the top to the bottom and in diagonal direction.

Considering the above, the size of the expanded matrix $\overline{B}$ will be (N'$\overline{S}$)×(M'$\overline{T}$) which simplifies to (N'$\overline{S}$)×(M'$\overline{S}$) for $\overline{S}$=$\overline{T}$. This is the case when the submatrices $\overline{B_{qp}^{sub,i,j}}$ are placed besides each other as explained above which is equivalent to a stride width W=$\overline{S}$. In the case that there is an overlap and the stride width W is thus smaller than the size $\overline{S}$ of the kernel, one easily finds that the resulting size of the expanded matrix is (N'+(N'−1)W)×(M'+(M'−1)W). This is, of course, only the case if the stride with W is identical from left to right and top to bottom. If this is not the case, different values $W_a$ and $W_b$ can be used for calculating the respective width.

The result of the processing of the encoded image by the deconvolution is an expanded matrix where the entries are calculated from the discreet operations and calculations described above with respect to the input matrix B and the kernels $\overline{K}$ used.

After that, the size of the expanded matrix $\overline{B}$ is larger than that of the original input matrix B, but might still not correspond to the size (i.e. number of pixels) of the original image.

In a further step, the intermediate expanded image corresponding to the expanded matrix $\overline{B}$ is then forwarded to the bilinear upsampling unit 511. In this unit, the expanded matrix $\overline{B}$ is upsampled using the otherwise commonly known technique of bilinear upsampling. This means that between adjacent pixels, new pixels are constructed using bilinear upsampling. This means that the values of the intermediate pixels are calculated using commonly known bilinear upsampling techniques. Considering for example four adjacent entries in the expanded matrix $\overline{B}$, these entries being $\overline{B_{ij}}$, $\overline{B_{i+1j}}$, $\overline{B_{ij+1}}$ and $\overline{B_{i+1j+1}}$. With the bilinear upsampling, one or more pixels in between adjacent pixels can be calculated in order to further expand the matrix B to arrive to another matrix, denoted for example as $\overline{\overline{B}}$. Due to this bilinear upsampling, the intermediate values thereby calculated represent a more "smooth" connection between the entries in the matrix calculated using the deconvolution.

After the processing of the expanded matrix $\overline{B}$ by the bilinear upsampling unit 511, a further intermediate decoded image 533 is obtained that is then forwarded to the next layer in the decoder. These procedures are repeated throughout all the layers of the decoder and, finally, a decoded output image 536 is obtained.

Where the decoded output image corresponds to a matrix with values for the respective entries it might be called matrix O as output matrix. This output matrix O has the same size N× M as the original image and correspondingly has one entry for each pixel in the original image.

However, the decoded image is not identical to the original input image, as, through the processing in the neural network, information was lost by, for example, applying the transformations in the encoder.

The values in the output matrix O can range from −∞ to +∞. Without regard to the actual form of the output decoded image, it will be assumed that, for each entry (corresponding to each pixel) in the output, there exists a value x corresponding to the value of the respective entry. To each value, an activation function may be applied where the activation function S(x) has the form $$\overline{x} = S(x) = \frac{1}{1+e^{-x}}.$$

This results in the values $\overline{x}$, compared to the original values x, being compressed to the interval between 0 and 1 where all new values x derived from values x<0 will be approximately 0 whereas other values x obtained from original values x>0 will be approximately 1.

This results in a new matrix $\overline{O}$ where the value associated with a specific pixel or entry has either the value $\overline{x}$≈0 or the value $\overline{x}$≈1.

In a further step, it is possible to further modify the matrix $\overline{O}$ by setting all values x that are smaller than 0.5 to 0 and all values x that are greater than 0.5 to 1.

The resulting matrix can be considered "black and white" image where the entries in the matrix having a value $\overline{x}$=0 might be considered to be white and the entries and the resulting matrix having values $\overline{x}$=1 may be considered black. The other way around is also possible and the reference to the "black and white" picture is only for exemplary purpose.

Due to the processing of the original image by the neural network, this will result in the region of interest being visible in the output matrix or output decoded image as having a specific shape for example an elliptical shape. This is because, due to the learned neural network and the processing of the input image, the ROI either corresponds to the values $\overline{x}$=1 or $\overline{x}$=0. The rest of the image will be faded out (corresponding to have the other value $\overline{x}$, respectively) which then allows to distinguish between the regions of interest and other portions or parts of the image.

In the next step, it is then possible to identify each pixel corresponding to the portion of the region of interest in the decoded output image with pixels in the original image as the size and arrangement of pixels in the decoded output image is the same as in the original input image. Thereby, the pixels in the original output image that are within the region of interest can be extracted.

During the processing of the original input image up to the decoded output image, it can occur that there are more than one region that are potential regions of interest. In order to distinguish between the real region of interest and other candidates for regions of interest, it is possible to choose the largest contiguous area within the decoded image and neglect all other areas as potential candidate regions of interest.

Due to the decoding procedure, the resulting number of pixels representing the region of interest may not be a smooth region but might contain steps or other distortions originating from the downsizing and upsizing and the information loss. This can be corrected by, for example, applying smoothing techniques as are commonly known in the art in order to obtain (almost elliptical) shape without steps.

The resulting region of interest in the decoded image and the pixels within this region of interest can then be matched as explained above to the original input image and the respective pixels of the original input image can be extracted as the actual region of interest and can then be further processed by, for example, storing the region of interest or proving it to an identification means in the manner as described, for example, with respect to FIGS. 1 and 2.

While, in relation to FIG. 5, the decoding was described making use of a specific order of deconvolutions and bilinear upsampling units, it is noted that also other combinations of these entities may be used. For example, embodiments of the present invention also encompass that only a number of deconvolutions is used that process the image in succession as described above. Alternatively, only bilinear upsampling units may be used in succession for processing the image.

Moreover, there are also embodiments where the number of bilinear upsampling units does not correspond to the number of deconvolutions. For example, there may be a bilinear upsampling unit provided only after each second deconvolution or after each third convolution. The same holds for the case where there is more bilinear upsampling units than deconvolutions. For example, there may be a deconvolution only after each second or third bilinear upsampling unit.

The provision of the bilinear upsampling units or deconvolutions does also not need to be uniform through the decoder. For example, in processing order of the input encoded image, there may first be a deconvolution followed by a bilinear upsampling unit, followed by two deconvolutions which are followed by a bilinear upsampling unit. After that, there may once again be only a single deconvolution followed immediately by a bilinear upsampling unit. Also other combinations can be thought of.

Figure 6:
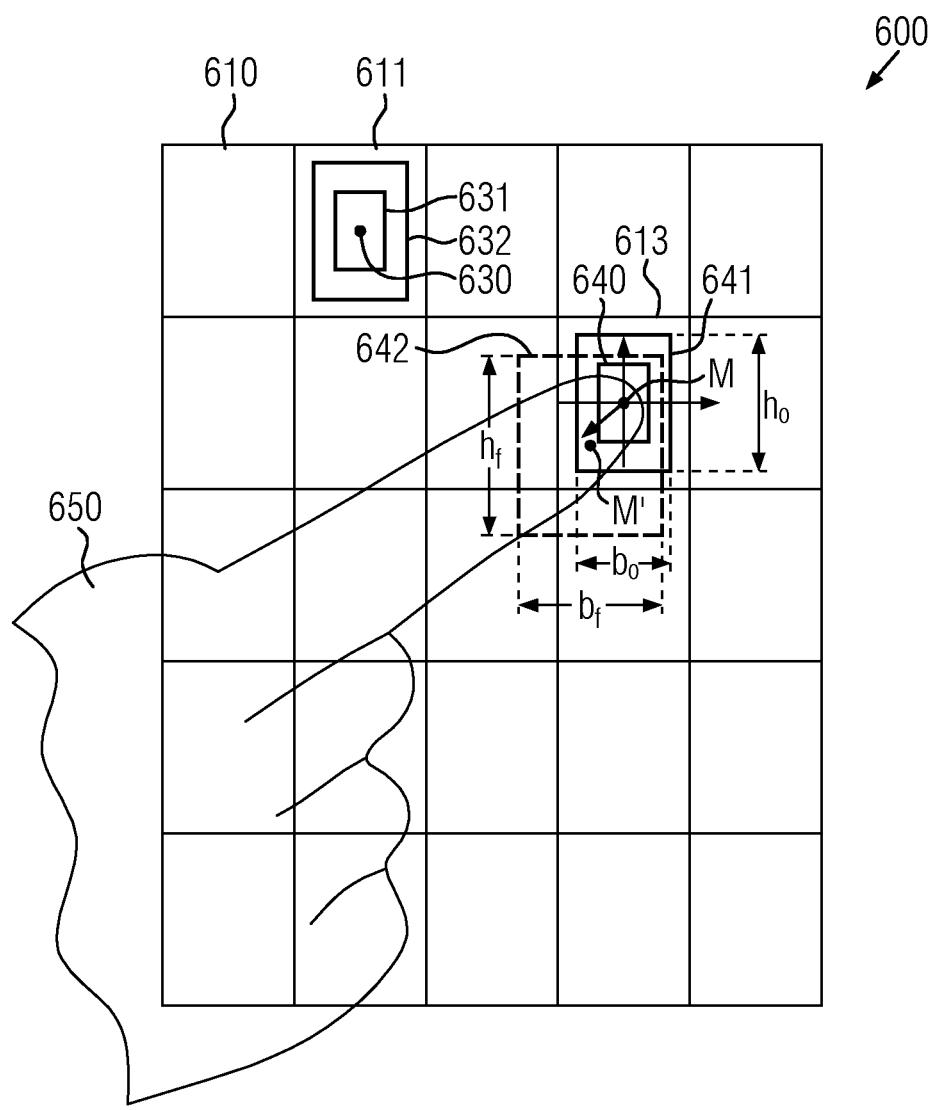
FIG. 6 is a schematic depiction of the creation and use of bounding boxes, according some embodiments.

FIG. 6 shows a further embodiment that extends the concept described in FIG. 4 and FIG. 5 in order to allow for an identification of a fingertip (specifically the pixels in the original image constituting the fingertip) using a number of bounding boxes and a separation of the original image into grids. This can allow for reducing the size of the image that has to be processed by the neural network for finding the ROI, thereby saving computer resources and processing power of the neural network.

It is noted that the steps described in the following can preferably be performed before processing the original image in the neural network by the encoder and decoder.

The embodiment described in FIG. 6 can either be implemented using the neural network already described or it can be implemented using another neural network. In any case, the used neural network is trained to be able to identify a region having a specific shape (preferably rectangular) that contains the object of interest that has the ROI. The respective neural network, however, does not need to be capable of separating the precise ROI from the rest of the image. It is thus less powerful in this regard as the neural network used for precisely identifying the ROI. This is because, for the neural network used in FIG. 6, the shape of the region to be separated from other regions is already defined (rectangular for example). The neural network is thus only able to properly position and scale this region, but it is not necessarily able to identify a completely unknown shaped ROI.

In accordance with the embodiment of FIG. 6, it will be assumed that the input received may be the original image. However, some preprocessing could have occurred already (color separation and the like, for example). Reference will thus only be made to "the image" although it is clear that instead of the image also one of the preprocessed images described earlier can be used.

In a first step, the image 600 received is separated into a plurality of grid cells 610, 611 and 613. The number of grid cells in each direction is not limited, but in a preferred embodiment, the image 600 is separated into 13 grid cells in horizontal direction and 13 grid cells in vertical direction such that instead of a general Q×R grid a 13×13 grid is created. Depending on the object from which the ROI is to be extracted, less or more grid cells can be used. In any case, embodiments of the present invention are not limited to the choosing of a specific number of grid cells.

In a next step, the center point 630 of each grid cell is identified and used for establishing the origin of a coordinate system for each of the grid cells separate from any of the other grid cells. Around this center 630, at least one bounding box 631 and 632 which will usually have the shape of a rectangle is arranged where those have, as can be seen in the grid cell 613, an initial height $h_0$ and a width or breadth $b_0$. For a plurality of bounding boxes in each grid cell, those values can be different from each other. For example, initial values $h_0$ and $b_0$ can be taken for the smallest bounding box per grid cell and those values can be increased by a factor 1.5 or 2 or any other value in order to calculate the dimensions of the other bounding boxes in the respective grid cell.

It is noted that the position of a bounding box, for example the bounding box 631 in the coordinate system of the respective grid cell will be represented by the position of the center point of the bounding box 631 with respect to the center point 630, i.e. the origin of the respective coordinate system, in the respective grid cell. Thus, the position of the respective bounding box in the grid cell 611 can be represented by two coordinates x and y. The width and height of the bounding box are considered to represent geometrical characteristics of the bounding box which can be represented by two values larger than 0.

As those bonding boxes will later be used to identify the position of the ROI or to provide a corresponding part of the original image to the respective neural network for processing, it is also appropriate to associate, with each of those bounding boxes, a fifth value which is the probability of the bounding box to include the respective object that is assumed to carry the ROI.

Thus, each bounding box can be represented by a vector of dimension 5 in the form $$b = \begin{pmatrix} x\text{-position of bounding box} \\ y\text{-position of bounding box} \\ \text{width } b \text{ of bounding box} \\ \text{heigth } h \text{ of bounding box} \\ \text{probability} \end{pmatrix}.$$

This means that the grid cells together with their respective bounding boxes can be represented in the form of a tensor T having the dimensions Q×R×B×A, where A is the number of bounding boxes per grid cell. In the most preferred case for identifying fingertips, Q=R=13, B=5 (the dimension of vector b) and A can be set to an integer between 3 and 10, most preferably 5.

As explained above, it is assumed that the neural network is already trained for identifying a specific object, preferably a fingertip. This involves that the neural network is able to identify a specific pattern of pixels that are most likely representing a fingertip. This might refer to specific patterns of color values or other characteristics like the brightness of those spots. It is, however, clear that the image 600 may arbitrarily show a fingertip or other object with a biometric characteristic which might not correspond in size and arrangement to a fingertip that was used for training the neural network.

With the help of the bounding boxes and the grid, however, it is possible for the neural network to identify the specific bounding box that will most likely comprise the fingertip. In order to identify this specific bounding box, the neural network (or an associated component that processes the image 600) compares the values of the pixels within each bounding box of each grid cell to a pattern of pixels that corresponds to a fingertip as was previously learned by the neural network. In this first stage, it is most unlikely that a perfect match will be found but there will be bounding boxes that are already more likely to contain at least a portion of a fingertip than other bounding boxes.

In the case depicted in FIG. 6, for example, the bounding box 641 centered around the point Min grid cell 613 includes a portion of the fingertip of the hand 650. In contrast to this, none of the grid cells 610 and 611 comprise bounding boxes that include a portion of a fingertip. When the method continues to evaluate the pixel values within the bounding box 641 and potentially the bounding box 640, the process can determine that the bounding box 641 includes even more of a pattern that corresponds to a fingertip than the bounding box 640.

In view of this, the method can conclude that none of the bounding boxes 631 and 632 (and potentially other bounding boxes in other grid cells) includes a fingertip and can set their probability value in their corresponding b-vector to 0.

As both bounding boxes 640 and 641 as centered around the point M comprise at least a portion of a fingertip, they may be considered to be likely to in fact comprise a fingertip and the probability value will be greater than 0 in a first step.

While the smaller grid cell 640 is almost completely filled with a pattern that could correspond to a fingertip, only the left border of the greater bounding box 641 may be regarded by the process to include a pattern that corresponds to a fingertip.

With this, the method may continue to calculate a loss function that determines the difference between the pattern identified within each of the bounding boxes 641 and 640 to a pattern obtained from learning which indeed corresponds to a fingertip.

In the next step, the method will attempt to minimize this difference by modifying the size and the position of the respective bounding boxes. In this regard, it can be envisaged that the larger bounding box 641 is used as the starting point and its position and shapes modified or the smaller bounding box 640 is used as the starting point and its position and size are modified in order to minimize the differences to the learned pattern.

This minimizing process can firstly comprise modifying the position of the bounding box (in the following, it will be assumed that the bounding box 641 is used for the further calculations) by moving it a small amount into orthogonal directions first along the x-axis and then along the y-axis (or vice versa) as depicted in FIG. 6 around the center point M of the respective grid cell. The movement will be along the positive and the negative x-axis and y-axis and at each position, a comparison will be made to determine a difference function between the pattern obtained from the learning and the actual pattern identified in the image. This allows for calculating a two-dimensional function that represents the difference $d(x, y)$ depending on the coordinates.

Based on this, a gradient $\nabla_{xy}d$ can be calculated which allows for determining in which direction in the coordinate system, the bounding box has to be moved in order to increase and preferably maximize the match with the learned pattern (corresponding to minimizing the value of the function $d(x, y)$). This will be the case for $\nabla_{xy}d=0$.

This can result in the bounding box being moved along the direction r to a new center point M' where the function $d(x, y)$ has a minimum. In a next step, the size of the respective bounding box at position M' can be increased and reduced in order to determine whether with increasing or reducing the size in one or two directions (i.e. the height and/or the width) changes the value of a further difference function compared to the original pattern which can be denoted with $e(h, b)$ depending on the height h and width b. This function is minimized such that for a specific bounding box having a position M' and having a height $h_f$ and a width $b_f$, the difference to the learned pattern is minimized.

This bounding box will then be used as the final bounding box which has the greatest probability $\rho$ of identifying those portions of the image 600 that contain the respective fingertip or object carrying the biometric characteristic. The output vector for this bounding box will then have the form $$b = \begin{pmatrix} x \\ y \\ b_f \\ h_f \\ p \end{pmatrix}$$

As a result of this process, a tensor T with dimension Q×R×B×A can output where, for each bounding box in each grid cell, the x and y position with respect to the center of the grid cell as well as the width and the height of the respective bounding box and its probability to identify or comprise a fingertip is given.

In order to prevent the movement of bounding boxes of adjacent grid cell to be moved into the same direction such that they overlap each other and in order to prevent bounding boxes of different grid cells to move into other grid cells, the method can be provided such that the movement of the center of a bounding box is only possible within its original grid cell.

The result will thus be a tensor comprising a plurality of vectors where one or more of those vectors have a high probability of identifying the fingertip whereas others have a low probability. Those with a low probability can be neglected completely by setting all their corresponding values to 0, thereby reducing the processing effort necessary in processing the tensor.

The vectors with the highest probability will then be used in order to allow the further processing of the image by the neural network using the encoder and the decoder.

While the above approach allows for properly identifying the bounding box that will be used to further process the part of the image comprising the object carrying the biometric characteristic, like a fingerprint, a further explanation will be given regarding the bounding boxes that have to be discarded.

As explained above, the vector b of a bounding box comprises a probability $\rho$ that indicates the likelihood that the respective bounding box includes or represents a fingertip. This can be used to sort all bounding boxes (or their vectors, respectively) in descending order beginning with those vectors b that have the highest probability value p.

Having done so, the list can be traversed in descending order beginning with the bounding box having the highest value p. This traversing can include selecting a specific bounding box with value p from the list and calculating, for this specific bounding box, the amount of intersection with all remaining bounding boxes. This means the area of the specific bounding box that is selected is compared to the area of the remaining bounding boxes and any areas they have in common (i.e. where the bounding boxes intersect) contributes to the calculated intersection.

The amount of intersection can be calculated as a ratio with respect to the area of the selected bounding box. Thereby, a dimensionless value is obtained for each calculated intersection that ranges from 0 (no intersection) to 1 (the considered remaining bounding box completely intersects or covers the area of the selected bounding box).

In a next step, a preset threshold can be used to neglect or discard bounding boxes or sort them out. In the above example, the threshold might be a calculated intersection of 0.75. For every calculated pair of a selected bounding box and a remaining bounding box for which the intersection exceeds this threshold, the bounding box having the lower value p can be neglected or sorted out from the list mentioned above.

This will finally result in only one bounding box remaining which will represent the part of the image comprising the ROI. This is, of course, not limited to a single bounding box as embodiments of the present invention can use, for example, more than one finger and its ROI for identifying the user.

Figure 7:
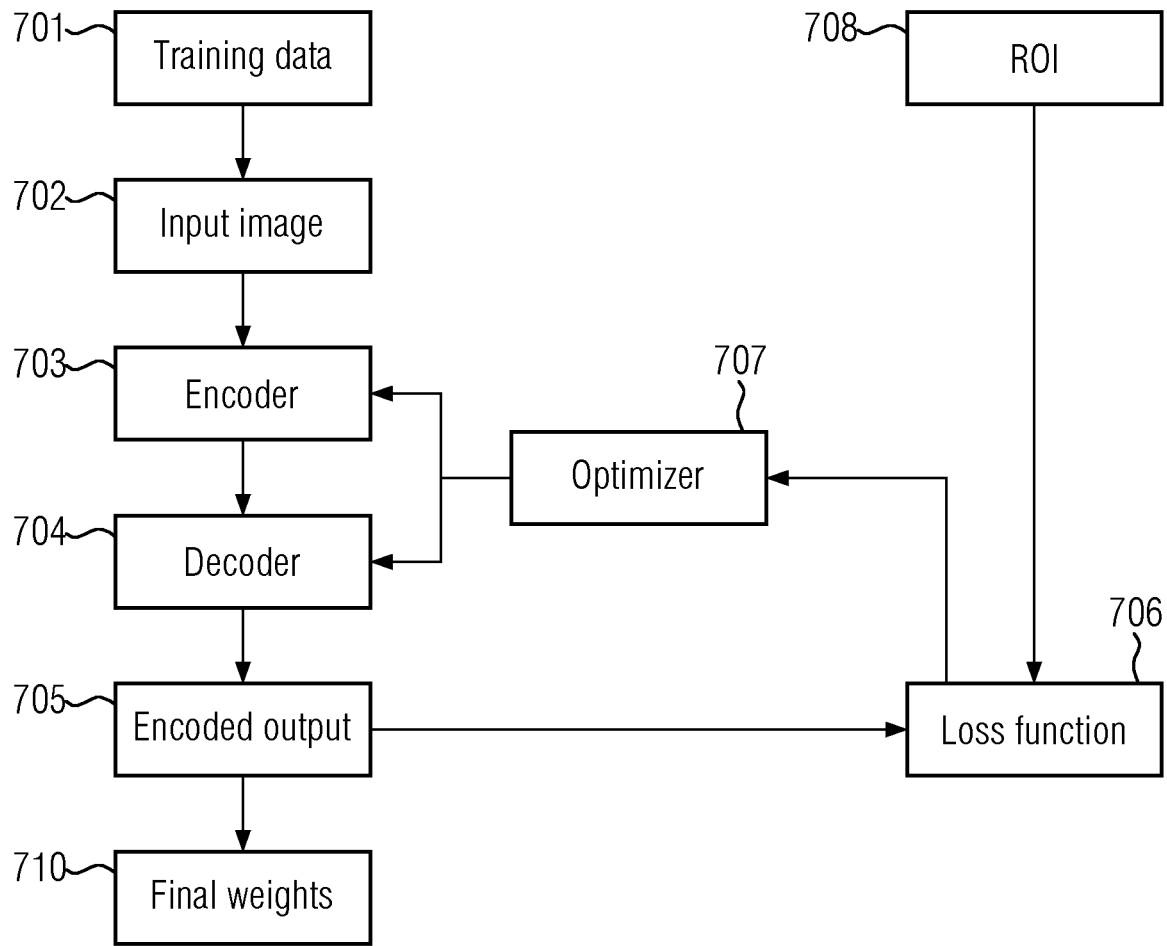
FIG. 7 is a flowchart of the training of the neural network according to one embodiment.

In FIG. 7, and explanation will now be given how the neural network can be properly trained such that the weights of the kernel K and the weight α of the encoder explained with respect to FIG. 4 as well as the values of the kernel K of the decoder are learned by the neural network.

While, in the following, reference will be made to training that neural network comprising the encoder and the decoder, the method can also be applied to training (that part of) the neural network that calculates the bounding boxes described in FIG. 6. This will basically only require changing the input data from preset ROIs to preset bounding boxes and corresponding values and providing the bounding boxes and corresponding values (specifically those defining the tensor T) to the respective neural network responsible for calculating the bounding boxes.

The method of FIG. 7 begins with the provision of training data 701 and ROIs. The training data may be constituted by a plurality of images of, for example, fingertips or a plurality of fingers depicted in one image together with other objects, like those images described in relation to FIG. 1. The images may be multiplied by using, from the same image, rotated, highlighted, darkened, enlarged or otherwise modified copies that are introduced as training data. The ROIs provided according to item 708 are ROIs corresponding to their respective image in the training data where those ROIs are the ROIs that are correctly associated with the object to be identified, i.e. have the correct size and the correct position as they would have if they were properly processed by the encoder and decoder. Such ROIs are provided for each and every image in the training data. They might be obtained by manually processing the training images. As the amount of training images can be artificially increased by providing the above mentioned modified copies, the number of images that have to be manually processed to define the ROIs for training can be reduced.

In the next step, one specific input image 702 is provided to the neural network in a training environment where, in addition to the neural network, an optimizer 707 and a loss function calculator 706 are provided.

The input image is, in a first round, processed using the encoder 703 as described in FIG. 4 and the decoder 704 as described in FIG. 5. This means the steps or the sections 703 and 704 depicted in FIG. 7 are run through as described with reference to FIGS. 4 and 5 using, in the section 703 the corresponding weights for the pointwise convolutional layer and the kernel K of the depthwise convolutional layer and in the section 704 the respective kernel K. The first and second batch normalizers as well as the rectified linear units of items 403 and 404 work in the manner as explained above with respect to FIG. 4. As these do not comprise trainable parameters, they will not be described in further detail below.

As a result, in line with FIG. 7, the output will be a first tensor encoded output image 705 comprising a ROI. This result will then be provided to the loss function where it will be compared with the preset ROIs in order to identify the differences between the result 705 and the correct ROI obtained from 708. This difference obtained by the loss function 706 is then provided to the optimizer 707 which, in turn, will modify the weights of each pointwise convolutional layer and each depthwise convolutional layer, i.e. a and the entries in the kernel K for the encoder and the corresponding entries in the kernel K of the layers of the decoder. This means that, either for all layers in the network at once or for each layer in isolation, the weight α of the pointwise convolutional layer and the entries in the kernel K of the depthwise convolutional layer and the kernel K̄ are manipulated.

With those new values, the cycle is repeated for the very same image and the resulting ROI is provided to the loss function and compared to the correct ROI, the result of which being then provided to the optimizer 707 which, once again, modifies the weights.

This procedure is performed as long as the difference between the resulting decoded output image and specifically the identified ROI compared to the predefined ROI of item 708 exceed a given threshold which, in essence, corresponds to the identification accuracy that is intended.

After that, the next input image 702 is taken from the training data 701 and the corresponding ROIs are provided to the loss function. Then, the process explained is repeated again for the new image and the optimal weights for the encoder and the decoder and their components are obtained. This is repeated until a specific combination of weights results in appropriate identification accuracy for all input images. The combination of weights that is then obtained is output as final weights 710.

These final weights are then introduced into the application that executes the method on the mobile device according to the description of the encoder and the decoder and, if applicable, after corresponding training of the neural network identifying the bounding boxes, also in the application of the neural network identifying the bounding box or part of the image comprising the ROI as explained in FIG. 6.

Therefore, in the concept of embodiments of the present invention, the neural network that is provided to the mobile device is already fully adapted to the identification of ROIs and can thus be employed without any further learning being required which further reduces the computer resources required at the mobile devices.

In total, by using the neural network comprising the encoder and the decoder and by optionally using the separation of the original image into grid cells and identifying the corresponding bounding boxes in line with the description of FIG. 6, an application can be provided that is small in size, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate identification results of the ROIs which can be used for later on performed identification of the user by the fingerprints associated with the fingertips, for example, as explained previously.

The above explanations focused on images of a hand or fingers that show the side of the fingers that carries the fingerprints. However, a user might also accidently or willingly present one or more fingers from the other side, i.e. the backhand, to the optical sensor. From such an image of a finger, a fingerprint cannot be extracted as it is not visible. The same holds, of course, also for other objects as explained. For example, instead of the palm of the hand, the user might show his backhand.

In order to distinguish an image of a fingertip that carries the fingerprint from an image of a fingertip that shows not the fingerprint but the nail or knuckles, the following procedure can be used that can extend the above explained methods to increase the identification accuracy. This can, of course, also be applied to other objects In the above examples, the bounding box was characterized by the vector $$b = \begin{pmatrix} x \\ y \\ b_f \\ h_f \\ p \end{pmatrix}$$

and the training was done using only images of fingers showing the side of the fingertips that carry the fingerprints.

When allowing images to be taken from both sides of the fingertips (i.e. the side bearing the fingerprint and the side bearing the nail or knuckles), it is advantageous to consider two classes of objects identified in images, namely those objects that constitute fingertips showing fingerprints and those objects that constitute fingertips showing nails or knuckles.

In this case, the vector mentioned above may be extended by one dimension c such that $$b = \begin{pmatrix} x \\ y \\ b_f \\ h_f \\ p \\ c \end{pmatrix}$$

where c represents a so called class. A first class may represent positive identification (a fingertip with a fingerprint can be identified) and the second class may represent a negative identification (the fingertip carries a nail or knuckle). The class may be represented by values, for example 1 for positive identification and 0 for negative identification. It is clear that, in contrast to the remaining values in the vector b, the class is a discrete value and can only take a limited number of different values corresponding to the number of classes.

The training mentioned above may then be performed in a manner that the neural network is provided with positive and negative identifications (instead of only the training data showing images with fingertips carrying fingerprints and bounding boxes 708) in order to be able to distinguish between images belonging either to the first or to the second class. In this context, one can imagine a plurality of images of fingers that show anything but not the fingerprint. All such "objects" may be categorized in the second class (i.e. negative identification) such that the neural network is trained to distinguish images of fingertips carrying fingerprints from "any other" images of fingertips. The bounding boxes provided for training will, of course, also comprise the correct class c in order to allow for properly training the network.

In order to identify all regions containing ROIs in an image, the process described above will neglect all bounding boxes that represent the position of an object and which are considered to belong to the second class (i.e. negative identification), thereby preventing further processing of images or portions of images of objects that do not show the biometric characteristic.

It is noted that applying this teaching to the optional processing of the image to obtaining bounding boxes that include the ROI is most preferred as the calculation of bounding boxes is easier compared to the determination of the ROI by the encoder and the decoder. However, the approach can likewise be adapted to the neural network comprising the encoder and the decoder as the processing of the image by the encoder and the decoder, after they have been trained, would lead to an encoded output image that does not comprise and ROI at all. This can then be used to establish that the image does not show an object in a way that the biometric characteristic can be extracted.

Figure 8:
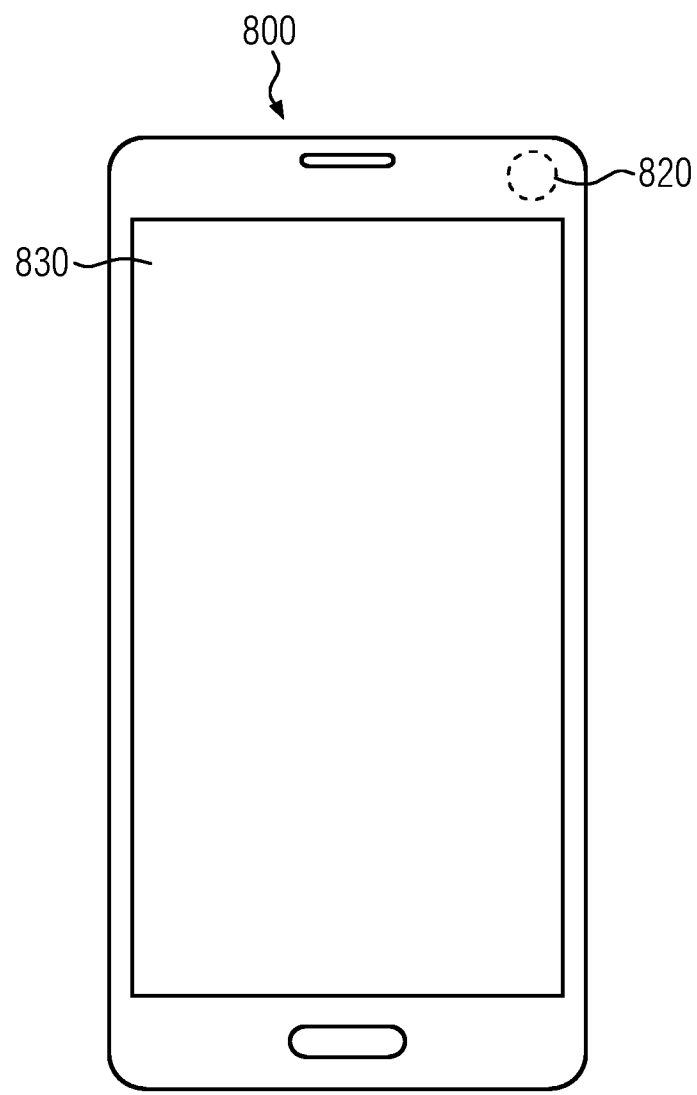
FIG. 8 is a schematic depiction of a mobile device that can be used together with the method according to one embodiment.

In order to give a context where the inventive method can be carried out, FIG. 8 depicts a mobile device in the form of a smartphone according to one embodiment of the invention.

The mobile device 800 is embodied as a smartphone as is presently known. It comprises an optical sensor 820 preferably on the backside of the camera which is opposite to the side of the mobile device 800 on which the display 830 is provided. The camera can be a camera having a resolution of 1 MP, 2 MP or even more, thus, for example an HD camera. It can be provided with a flashlight but does not need to. It can also be adapted to take real-time images with a reduced resolution and once the camera is activated, the display 830 may show a representation of what the camera actually "sees".

In one embodiment of the invention, once the inventive method is carried out for a taken image, the bounding boxes identifying the fingertips of the hand are augmented over the image of the hand displayed on the display 830. As was further explained above, the identified bounding boxes do not need to be displayed but can also be processed further internal to the mobile device in order to, for example, process the portions of the image that correspond to the fingertips such that the ROIs can be extracted.

What is claimed is:

1. A method comprising:
   obtaining, by a processing device from an optical sensor of a mobile device, an image of an object;
   processing, by the processing device, the image using a neural network, wherein processing the image comprises distinguishing, using the neural network, a first portion of the image comprising a region of interest, ROI, from a second portion of the image, wherein processing the image comprises processing the image by an encoder to obtain an encoded image and processing the encoded image by a decoder to obtain a decoded output image;
   wherein the neural network comprises a set of encoder layers and a set of decoder layers, wherein processing the image comprises processing, by a first encoder layer of the set of encoder layers, an input to create a first intermediate encoded output and processing, by each following encoder layer of the set of encoder layers, an encoded output of a preceding encoder layer;

each encoder layer of the set of encoder layers is a depthwise separable convolution comprising a depthwise convolutional layer, a first batch normalizer, a first rectified linear unit, a pointwise convolutional layer, a second batch normalizer and a second rectified linear unit;

by processing the input using the set of encoder layers, the encoder obtains the encoded image;

processing the encoded image by the decoder to obtain the decoded output image comprises processing, by a first decoder layer of the set of decoder layers, the input to create a first intermediate decoded output and processing, by each following decoder layer of the set of decoder layers, a decoded output of a preceding decoder layer, each decoder layer comprising at least one of a deconvolutional layer or a bilinear upsampling layer; and by processing the encoded image using the set of decoder layers, the decoder obtains the decoded output image;

after processing the image, extracting, by the processing device, the ROI from the image;

extracting, by the processing device, a biometric characteristic of the object from the ROI; and processing, by the processing device, the biometric characteristic of the object to determine whether the biometric characteristic of the object identifies a user.

2. The method of claim 1, wherein:

the object comprises a first fingertip and the biometric characteristic comprises a first fingerprint of the first fingertip;

the method further comprises extracting, by the processing device from the first fingerprint, a biometric feature corresponding to the first fingerprint to obtain a first extracted biometric feature; and processing the biometric characteristic of the object comprises comparing the first extracted biometric feature to a stored biometric feature stored in a storage device to identify a difference between the first extracted biometric feature and the stored biometric feature, wherein if the difference is below a threshold, the user is identified by the first fingerprint and, if the difference is above the threshold, the user is not identified by the first fingerprint.

3. The method of claim 1, wherein:

the object comprises a plurality of fingertips comprising a first fingertip and a second fingertip;

the biometric characteristic comprises a first fingerprint of the first fingertip and a second fingerprint of the second fingertip;

the method further comprises extracting, by the processing device respectively from the first fingerprint and the second fingerprint, a first biometric feature corresponding to the first fingertip and a second biometric feature corresponding to the second fingertip to obtain a first extracted biometric feature and a second extracted biometric feature, respectively; and processing the biometric characteristic of the object comprises using the first and second extracted biometric features for identification of the user.

4. The method of claim 3, wherein the user is identified by at least one of:

determining that a combined identification accuracy of fingerprints of all fingertips in the image, including the first fingertip and the second fingertip, is above a given threshold; or determining that, for each fingertip in the image, a difference between an extracted biometric feature of the fingerprint of the fingertip and a stored biometric feature of the fingerprint of the fingertip is below a threshold.

5. The method of claim 1, wherein the optical sensor is comprised in a camera of the mobile device.

6. The method of claim 1, wherein the image comprises pixels and the encoded image comprises n×m pixels, where n<N, m<M and the decoded output image comprises N×M pixels.

7. The method of claim 1, wherein processing the image comprises distinguishing a first portion of the decoded output image from a second portion of the decoded output image.

8. The method of claim 7, wherein extracting the biometric characteristic comprises:

identifying one or more pixels in the decoded output image that are within the first portion of the decoded output image;

identifying the one or more pixels in the decoded output image with corresponding one or more pixels in the image; and extracting, from the image, the corresponding one or more pixels of the image to obtain extracted pixels, the extracted pixels constituting the biometric characteristic.

9. The method of claim 7, wherein, in the decoded image, each pixel has a value $x \in ]-\infty; +\infty[$ and, before distinguishing of the first portion of the decoded image from the second portion of the decoded image, an activation function $$S(x) = \frac{1}{1+e^{-x}}$$

is applied to each pixel in the decoded image and a normalized value $\bar{x}=S(x)$ is associated with each pixel in the decoded image, wherein the distinguishing is performed on the pixels with the values $\bar{x}$.

10. The method of claim 1, wherein processing the image comprises creating, from the image, at least one matrix I that represents a color value for each pixel in the image and providing the matrix as input to the neural network, wherein the image comprises pixels and the matrix I is a matrix comprising N×M values, wherein the entries of the matrix I are given by $I_{ij}$, where i and j are integers and i=1 ... N and j=1 ... M.

11. The method of claim 10, wherein each depthwise convolutional layer of the encoder applies a predefined kernel K to a matrix A with entries $A_{ij}$ with i=1 ... $\bar{N}$ and j=1 ... $\bar{M}$, where $\bar{N} \leq N$, $\bar{M} \leq N$ received as input, the kernel K being a matrix of size S×T where S, T<N; S,T<M comprising entries $S_{ab}$, wherein applying the kernel to the matrix comprises calculating an inner product of the matrix K with each reduced matrix R of size $(N \times M)_{S,T}$ of a matrix Z, where the matrix R has a same size as the kernel K, and the matrix Z has size $((N+2P_w) \times (M+2P_h))$ and the entries of the matrix $Z_{cd}$ with c, d∈ $\mathbb{N}^+$ are given by $$Z_{cd} = \begin{cases} 0 \,\forall\, c \leq P_w \\ 0 \,\forall\, c > P_w + \overline{N} \\ 0 \,\forall\, d \leq P_h \\ 0 \,\forall\, d > P_h + \overline{M} \\ A_{ij} \text{ where } c = i + P_w; d = j + P_h; i = 1\ldots\overline{N}; j = 1\ldots\overline{M} \end{cases}$$

and provide a matrix P as output, wherein the matrix P has the size $$\left(\frac{\overline{N} - S + 2P_w}{W_w} + 1\right) \times \left(\frac{\overline{M} - T + 2P_h}{W_h} + 1\right),$$

where $W_w$ and $W_h$ define a stride width and each entry $P_{ij}$ of the matrix P is a value of an inner product of the ij-th reduced matrix R with the kernel K, wherein the matrix P is provided as output by the depthwise convolutional layer.

12. The method of claim 11, wherein the decoder is adapted to apply a transformation to the encoded image, the transformation creating, from an input matrix B of size N'×M' with entries, an expanded matrix by expanding each entry $B_{ij}$ of the matrix B by multiplying the entry with a kernel, the kernel $\overline{K}$ being a matrix of size $\overline{S} \times \overline{T}$ with entries $\overline{K_{qp}}$, to a submatrix $\overline{B}^{sub,ij}$ with entries $\overline{B_{qp}}^{sub,ij} = B_{ij}\overline{K_{qp}}$, and combining the submatrices $\overline{B_{qp}}^{sub,ij}$ to obtain the expanded matrix $\overline{B}$.

13. The method of claim 12, wherein the size of the kernel K and is equal for all depthwise convolutional layers and/or at least one of the entries in the kernel K or $\overline{K}$ is different from another entry in the kernel K.

14. The method of claim 11, wherein:
the first batch normalizer creates a normalized reduced matrix P' and the first rectified linear unit applies a rectification function to entries $P''_{ij}$;
the rectification function calculates a new matrix $\overline{P}$ with entries $$\overline{P}_{ij} = \begin{cases} 0 \,\forall\, P''_{ij} < 0 \\ P''_{ij} \,\forall\, P''_{ij} \geq 0 \end{cases}$$

and
the new matrix $\overline{P}$ is provided as output, and/or the pointwise convolutional layer applies a weight to a matrix received from a preceding layer by multiplying each entry in the matrix with the weight α.

15. The method of claim 1, further comprising:
prior to processing the image, separating, by the processing device, the image into a grid comprising a plurality of grid cells, wherein at least one bounding box is created within each grid cell of the plurality of grid cells, each bounding box having a predetermined position within the grid cell and predetermined geometrical characteristics;
modifying the predetermined position and the predetermined geometrical characteristics of the bounding box to obtain a resulting bounding box, wherein the resulting bounding box has a resulting position and resulting geometrical characteristics that most closely match a location of the object; and
providing pixels of the image included in the bounding box to the neural network as part of the image.

16. The method of claim 15, wherein the predetermined position of the bounding box is calculated relative to a center of the grid cell in two dimensions and the predetermined geometrical characteristics of the bounding box comprise a height and a width of the bounding box, and wherein the bounding box is associated with a probability of the object being within the bounding box.

17. The method of claim 1, wherein each step of the method is performed on the mobile device.

18. A system comprising:
an optical sensor of a mobile device;
a processor; and
a storage device storing executable instructions that, when executed by the processor of the mobile device, cause the processor to perform operations comprising:
obtaining, an image of an object from the optical sensor of the mobile device;
processing the image using a neural network, wherein processing the image comprises distinguishing, using the neural network, a first portion of the image comprising a region of interest, ROI, from a second portion of the image, wherein processing the image comprises processing the image by an encoder to obtain an encoded image and processing the encoded image by a decoder to obtain a decoded output image;
wherein the neural network comprises a set of encoder layers and a set of decoder layers, wherein processing the image comprises processing, by a first encoder layer of the set of encoder layers, an input to create a first intermediate encoded output and processing, by each following encoder layer of the set of encoder layers, an encoded output of a preceding encoder layer;
each encoder layer of the set of encoder layers is a depthwise separable convolution comprising a depthwise convolutional layer, a first batch normalizer, a first rectified linear unit, a pointwise convolutional layer, a second batch normalizer and a second rectified linear unit;
by processing the input using the set of encoder layers, the encoder obtains the encoded image;
processing the encoded image by the decoder to obtain the decoded output image comprises processing, by a first decoder layer of the set of decoder layers, the input to create a first intermediate decoded output and processing, by each following decoder layer of the set of decoder layers, a decoded output of a preceding decoder layer, each decoder layer comprising at least one of a deconvolutional layer or a bilinear upsampling layer; and
by processing the encoded image using the set of decoder layers, the decoder obtains the decoded output image;
after processing the image, extracting the ROI from the image;
extracting a biometric characteristic of the object from the ROI; and
processing the biometric characteristic of the object to determine whether the biometric characteristic of the object identifies a user.

19. The system of claim 18, wherein:
the object comprises a first fingertip and the biometric characteristic comprises a first fingerprint of the first fingertip;

the operations further comprise extracting, from the first fingerprint, a biometric feature corresponding to the first fingerprint to obtain a first extracted biometric feature; and processing the biometric characteristic of the object comprises comparing the first extracted biometric feature to a stored biometric feature stored in the storage device to identify a difference between the first extracted biometric feature and the stored biometric feature, wherein if the difference is below a threshold, the user is identified by the first fingerprint and, if the difference is above the threshold, the user is not identified by the first fingerprint.

20. The system of claim 18, wherein:

the object comprises a plurality of fingertips comprising a first fingertip and a second fingertip;

the biometric characteristic comprises a first fingerprint of the first fingertip and a second fingerprint of the second fingertip;

the operations further comprise extracting, respectively from the first fingerprint and the second fingerprint, a first biometric feature corresponding to the first fingertip and a second biometric feature corresponding to the second fingertip to obtain a first extracted biometric feature and a second extracted biometric feature, respectively; and processing the biometric characteristic of the object comprises using the first and second extracted biometric features for identification of the user.

* * * * *